United States Patent
Jiang et al.

(10) Patent No.: US 11,470,625 B2
(45) Date of Patent: Oct. 11, 2022

(54) TIME DIVISION DUPLEX (TDD) SUBFRAME STRUCTURE SUPPORTING SINGLE AND MULTIPLE INTERLACE MODES

(71) Applicant: QUALCOMM Incorporated, San Diego, CA (US)

(72) Inventors: Jing Jiang, San Diego, CA (US); Peter Pui Lok Ang, San Diego, CA (US); Krishna Kiran Mukkavilli, San Diego, CA (US); Tingfang Ji, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/681,387

(22) Filed: Nov. 12, 2019

(65) Prior Publication Data

US 2020/0084784 A1    Mar. 12, 2020

Related U.S. Application Data

(63) Continuation of application No. 15/994,863, filed on May 31, 2018, now Pat. No. 10,512,098, which is a
(Continued)

(51) Int. Cl.
*H04J 3/00*       (2006.01)
*H04W 72/12*   (2009.01)
(Continued)

(52) U.S. Cl.
CPC ....... *H04W 72/1263* (2013.01); *H04L 5/0055* (2013.01); *H04L 5/1469* (2013.01); *H04L 5/0007* (2013.01); *H04L 5/0044* (2013.01)

(58) Field of Classification Search
CPC . H04W 72/1263; H04L 5/0055; H04L 5/1469
(Continued)

(56) References Cited

U.S. PATENT DOCUMENTS

RE39,375 E    11/2006  Hamalainen et al.
7,280,467 B2  10/2007  Smee et al.
(Continued)

FOREIGN PATENT DOCUMENTS

CN    1685639 A      10/2005
CN    101060389 A    10/2007
(Continued)

OTHER PUBLICATIONS

International Search Report and Written Opinion—PCT/US2016/039408—ISA/EPO—dated Sep. 7, 2016.
(Continued)

*Primary Examiner* — Thai D Hoang
(74) *Attorney, Agent, or Firm* — Qualcomm Incorporated

(57) ABSTRACT

Aspects of the present disclosure provide a time division duplex (TDD) subframe structure that supports both single and multiple interlace modes of operation. In a single interlace mode, control information, data information corresponding to the control information and acknowledgement information corresponding to the data information are included in a single subframe. In a multiple interlace mode, at least one of the control information, the data information corresponding to the control information or the acknowledgement information corresponding to the data information is included in a different subframe. Both single and multiple interlace modes can be multiplexed together within the TDD subframe structure.

58 Claims, 20 Drawing Sheets

Related U.S. Application Data continuation of application No. 15/051,949, filed on Feb. 24, 2016, now Pat. No. 9,992,790.

(60) Provisional application No. 62/194,710, filed on Jul. 20, 2015.

(51) Int. Cl.
*H04L 5/00* (2006.01)
*H04L 5/14* (2006.01)

(58) Field of Classification Search
USPC .................................................. 370/276–280
See application file for complete search history.

(56) References Cited

U.S. PATENT DOCUMENTS

| | | | |
|---|---|---|---|
| 7,515,579 | B2 | 4/2009 | Cheng et al. |
| 8,213,345 | B2 | 7/2012 | Suo et al. |
| 8,363,597 | B2 | 1/2013 | Abraham et al. |
| 8,396,013 | B2 | 3/2013 | Khandekar et al. |
| 8,472,465 | B2 | 6/2013 | Suo et al. |
| 8,599,702 | B2 | 12/2013 | Kim et al. |
| 8,614,977 | B2 | 12/2013 | Wu et al. |
| 8,700,023 | B2 | 4/2014 | Nan et al. |
| 8,724,636 | B2 | 5/2014 | Chen et al. |
| 8,756,477 | B2 | 6/2014 | Challa et al. |
| 8,787,344 | B2 | 7/2014 | Malladi et al. |
| 8,804,618 | B2 | 8/2014 | Hu et al. |
| 8,848,620 | B2 | 9/2014 | Fan et al. |
| 8,861,408 | B2 | 10/2014 | Damnjanovic et al. |
| 8,923,223 | B2 | 12/2014 | Chen et al. |
| 8,948,064 | B2 | 2/2015 | Shahar |
| 9,001,780 | B2 | 4/2015 | Chen et al. |
| 9,083,517 | B2 | 7/2015 | Chen et al. |
| 9,100,155 | B2 | 8/2015 | Luo et al. |
| 9,113,491 | B2 | 8/2015 | Montojo et al. |
| 9,154,266 | B2 | 10/2015 | Yang et al. |
| 9,369,877 | B2 | 6/2016 | Liu et al. |
| 9,398,575 | B2 | 7/2016 | Clevorn |
| 9,584,290 | B2 | 2/2017 | Prakash et al. |
| 9,609,636 | B2 * | 3/2017 | Yang ........................ H04L 1/18 |
| 9,642,124 | B2 | 5/2017 | Li et al. |
| 9,775,151 | B2 | 9/2017 | Jung et al. |
| 9,814,058 | B2 | 11/2017 | Jiang et al. |
| 9,930,687 | B2 | 3/2018 | Mizusawa et al. |
| 9,936,519 | B2 | 4/2018 | Mukkavilli et al. |
| 9,955,460 | B2 | 4/2018 | Tavildar et al. |
| 9,974,093 | B2 | 5/2018 | Lin et al. |
| 9,992,790 | B2 | 6/2018 | Jiang et al. |
| 10,003,986 | B2 | 6/2018 | Liu et al. |
| 10,020,971 | B2 | 7/2018 | Hwang et al. |
| 10,075,970 | B2 | 9/2018 | Jiang et al. |
| 10,123,219 | B2 | 11/2018 | Bhushan et al. |
| 10,219,292 | B2 | 2/2019 | Damnjanovic et al. |
| 10,342,012 | B2 | 7/2019 | Mukkavilli et al. |
| 10,390,361 | B2 | 8/2019 | Mukkavilli et al. |
| 10,411,871 | B2 | 9/2019 | Liu et al. |
| 10,440,726 | B2 | 10/2019 | Jiang et al. |
| 10,499,393 | B2 | 12/2019 | Mukkavilli et al. |
| 10,624,156 | B2 | 4/2020 | Xiong et al. |
| 2001/0028629 | A1 | 10/2001 | Uneyama et al. |
| 2003/0108013 | A1 | 6/2003 | Hwang et al. |
| 2005/0197680 | A1 | 9/2005 | Delmain et al. |
| 2006/0062192 | A1 | 3/2006 | Payne, III |
| 2007/0211656 | A1 | 9/2007 | Kwak et al. |
| 2008/0070586 | A1 | 3/2008 | Kermoal et al. |
| 2008/0080476 | A1 | 4/2008 | Cho et al. |
| 2008/0220791 | A1 | 9/2008 | Cho et al. |
| 2009/0040999 | A1 | 2/2009 | Yuk |
| 2009/0103482 | A1 | 4/2009 | Imamura et al. |
| 2009/0129259 | A1 * | 5/2009 | Malladi ................ H04B 7/0417 |
| | | | 370/210 |
| 2009/0137230 | A1 | 5/2009 | Miyoshi et al. |
| 2009/0141690 | A1 | 6/2009 | Fan et al. |
| 2009/0161591 | A1 | 6/2009 | Ahmadi et al. |
| 2009/0161649 | A1 | 6/2009 | Ponnathota et al. |
| 2009/0181689 | A1 * | 7/2009 | Lee ........................ H04L 1/1887 |
| | | | 455/450 |
| 2009/0201838 | A1 | 8/2009 | Zhang et al. |
| 2009/0213769 | A1 | 8/2009 | Shen et al. |
| 2009/0276676 | A1 | 11/2009 | Lee et al. |
| 2009/0323666 | A1 | 12/2009 | Malladi et al. |
| 2010/0080137 | A1 | 4/2010 | Vedantham et al. |
| 2010/0118730 | A1 | 5/2010 | Tanaka et al. |
| 2010/0211845 | A1 | 8/2010 | Lee et al. |
| 2010/0265851 | A1 | 10/2010 | Shahar |
| 2010/0275086 | A1 | 10/2010 | Bergquist et al. |
| 2010/0309867 | A1 | 12/2010 | Palanki et al. |
| 2010/0322114 | A1 * | 12/2010 | Li ........................ H04L 5/0053 |
| | | | 370/278 |
| 2011/0007730 | A1 | 1/2011 | Han et al. |
| 2011/0167326 | A1 | 7/2011 | Kuri et al. |
| 2011/0211503 | A1 | 9/2011 | Che et al. |
| 2011/0274063 | A1 | 11/2011 | Li |
| 2011/0310777 | A1 | 12/2011 | Jiang et al. |
| 2011/0310802 | A1 | 12/2011 | Song et al. |
| 2011/0310830 | A1 * | 12/2011 | Wu ........................ H04L 5/0032 |
| | | | 370/329 |
| 2012/0057547 | A1 | 3/2012 | Lohr et al. |
| 2012/0135773 | A1 | 5/2012 | Shen et al. |
| 2012/0147773 | A1 | 6/2012 | Kim et al. |
| 2012/0230232 | A1 | 9/2012 | Ji et al. |
| 2012/0250592 | A1 | 10/2012 | Chun et al. |
| 2012/0275355 | A1 | 11/2012 | Park et al. |
| 2012/0287882 | A1 | 11/2012 | Kim et al. |
| 2012/0294204 | A1 * | 11/2012 | Chen ........................ H04L 1/1812 |
| | | | 370/280 |
| 2012/0300738 | A1 | 11/2012 | Palanki et al. |
| 2013/0028205 | A1 | 1/2013 | Damnjanovic et al. |
| 2013/0039193 | A1 | 2/2013 | Yin et al. |
| 2013/0039231 | A1 | 2/2013 | Wang |
| 2013/0083736 | A1 | 4/2013 | Yin et al. |
| 2013/0083740 | A1 | 4/2013 | Eriksson et al. |
| 2013/0121186 | A1 | 5/2013 | Vajapeyam et al. |
| 2013/0128781 | A1 | 5/2013 | Li et al. |
| 2013/0163536 | A1 | 6/2013 | Anderson et al. |
| 2013/0194980 | A1 | 8/2013 | Yin et al. |
| 2013/0242822 | A1 | 9/2013 | Yang et al. |
| 2013/0242904 | A1 | 9/2013 | Sartori et al. |
| 2013/0286902 | A1 | 10/2013 | Chen et al. |
| 2013/0301486 | A1 | 11/2013 | Kishiyama |
| 2013/0315113 | A1 * | 11/2013 | Seo ........................ H04L 5/001 |
| | | | 370/280 |
| 2013/0343239 | A1 * | 12/2013 | Damnjanovic ......... H04L 5/001 |
| | | | 370/280 |
| 2014/0036740 | A1 | 2/2014 | Lee et al. |
| 2014/0044061 | A1 | 2/2014 | Yue et al. |
| 2014/0050192 | A1 | 2/2014 | Kim et al. |
| 2014/0071921 | A1 | 3/2014 | Wang et al. |
| 2014/0071954 | A1 | 3/2014 | Au et al. |
| 2014/0086078 | A1 * | 3/2014 | Malladi ................ H04W 72/042 |
| | | | 370/252 |
| 2014/0106688 | A1 | 4/2014 | Negus et al. |
| 2014/0120969 | A1 | 5/2014 | Sang et al. |
| 2014/0126499 | A1 | 5/2014 | Li et al. |
| 2014/0133369 | A1 | 5/2014 | Cheng et al. |
| 2014/0146798 | A1 | 5/2014 | Damnjanovic et al. |
| 2014/0153450 | A1 | 6/2014 | Jang et al. |
| 2014/0153453 | A1 | 6/2014 | Park et al. |
| 2014/0169238 | A1 | 6/2014 | Cai et al. |
| 2014/0204783 | A1 | 7/2014 | Lin et al. |
| 2014/0204807 | A1 * | 7/2014 | Li ........................ H04B 1/50 |
| | | | 370/277 |
| 2014/0226552 | A1 | 8/2014 | Niu et al. |
| 2014/0233469 | A1 | 8/2014 | Seo et al. |
| 2014/0241225 | A1 | 8/2014 | Novak et al. |
| 2014/0286255 | A1 | 9/2014 | Nam et al. |
| 2014/0301252 | A1 * | 10/2014 | Choi ........................ H04B 7/265 |
| | | | 370/278 |
| 2014/0307597 | A1 * | 10/2014 | Kim ........................ H04L 5/0055 |
| | | | 370/280 |
| 2014/0321382 | A1 | 10/2014 | Guan |

(56) References Cited

U.S. PATENT DOCUMENTS

| | | |
|---|---|---|
| 2014/0341091 A1* | 11/2014 | Ji .................... H04L 5/1469 370/280 |
| 2014/0342745 A1 | 11/2014 | Bhushan et al. |
| 2015/0003304 A1 | 1/2015 | Wu et al. |
| 2015/0036561 A1 | 2/2015 | Wang et al. |
| 2015/0043392 A1 | 2/2015 | Susitaival et al. |
| 2015/0043394 A1* | 2/2015 | Lin .................... H04L 1/1861 370/280 |
| 2015/0043395 A1 | 2/2015 | Dai et al. |
| 2015/0085713 A1 | 3/2015 | He et al. |
| 2015/0085834 A1 | 3/2015 | Liu et al. |
| 2015/0092566 A1 | 4/2015 | Balachandran et al. |
| 2015/0092703 A1 | 4/2015 | Xu et al. |
| 2015/0103702 A1 | 4/2015 | Lahetkangas et al. |
| 2015/0109972 A1 | 4/2015 | Khoryaev et al. |
| 2015/0139139 A1 | 5/2015 | Park et al. |
| 2015/0146588 A1* | 5/2015 | Park .................... H04L 5/0055 370/280 |
| 2015/0156762 A1* | 6/2015 | Hwang .............. H04L 1/1671 370/311 |
| 2015/0180619 A1 | 6/2015 | Majjigi et al. |
| 2015/0180622 A1* | 6/2015 | Yoo .................... H04L 27/2602 370/330 |
| 2015/0181580 A1 | 6/2015 | Aiba et al. |
| 2015/0181612 A1 | 6/2015 | Gan et al. |
| 2015/0188650 A1 | 7/2015 | Au et al. |
| 2015/0237619 A1* | 8/2015 | Yang .................. H04W 72/0413 370/280 |
| 2015/0249980 A1 | 9/2015 | You et al. |
| 2015/0264662 A1 | 9/2015 | Sahlin et al. |
| 2015/0271837 A1 | 9/2015 | Larsson et al. |
| 2015/0312889 A1 | 10/2015 | Lee et al. |
| 2015/0326291 A1 | 11/2015 | Wong et al. |
| 2015/0333898 A1 | 11/2015 | Ji et al. |
| 2015/0349929 A1 | 12/2015 | Bhorkar et al. |
| 2015/0358918 A1 | 12/2015 | Gao et al. |
| 2016/0028512 A1 | 1/2016 | Papasakellariou |
| 2016/0112181 A1* | 4/2016 | Tabet ................. H04W 72/0413 370/296 |
| 2016/0119840 A1 | 4/2016 | Loehr et al. |
| 2016/0142292 A1 | 5/2016 | Au et al. |
| 2016/0182213 A1 | 6/2016 | Golitschek Edler Von Elbwart et al. |
| 2016/0192396 A1 | 6/2016 | Ng |
| 2016/0205683 A1 | 7/2016 | Quan et al. |
| 2016/0205690 A1 | 7/2016 | Berggren et al. |
| 2016/0212734 A1 | 7/2016 | He et al. |
| 2016/0219518 A1* | 7/2016 | Zhao .................... H04W 76/28 |
| 2016/0219569 A1 | 7/2016 | Kuo et al. |
| 2016/0227425 A1 | 8/2016 | Kim et al. |
| 2016/0233904 A1 | 8/2016 | Wu et al. |
| 2016/0234834 A1 | 8/2016 | Aboul-Magd et al. |
| 2016/0249329 A1 | 8/2016 | Au et al. |
| 2016/0270060 A1 | 9/2016 | Kusashima et al. |
| 2016/0294531 A1 | 10/2016 | Loehr et al. |
| 2016/0315741 A1 | 10/2016 | Tsai et al. |
| 2016/0323852 A1 | 11/2016 | Golitschek et al. |
| 2016/0323854 A1 | 11/2016 | Gao et al. |
| 2016/0330010 A1 | 11/2016 | Oin et al. |
| 2016/0330737 A1 | 11/2016 | Takeda et al. |
| 2016/0366704 A1 | 12/2016 | Lee et al. |
| 2016/0374082 A1 | 12/2016 | Nguyen et al. |
| 2017/0013565 A1 | 1/2017 | Pelletier et al. |
| 2017/0013610 A1 | 1/2017 | Lee et al. |
| 2017/0013673 A1 | 1/2017 | Uchino et al. |
| 2017/0019905 A1 | 1/2017 | Ko et al. |
| 2017/0019930 A1 | 1/2017 | Lee et al. |
| 2017/0026992 A1* | 1/2017 | Jiang .................... H04L 5/1469 |
| 2017/0085344 A1 | 3/2017 | Yang |
| 2017/0111106 A1 | 4/2017 | Lee et al. |
| 2017/0118743 A1 | 4/2017 | Kim et al. |
| 2017/0150367 A1 | 5/2017 | Han et al. |
| 2017/0150424 A1 | 5/2017 | Lee et al. |
| 2017/0215188 A1 | 7/2017 | Kim et al. |
| 2017/0215201 A1 | 7/2017 | Kim et al. |
| 2017/0257878 A1 | 9/2017 | Kazmi et al. |
| 2017/0290008 A1 | 10/2017 | Tooher et al. |
| 2017/0303144 A1 | 10/2017 | Guo et al. |
| 2017/0318564 A1 | 11/2017 | Lee et al. |
| 2017/0367058 A1 | 12/2017 | Pelletier et al. |
| 2017/0367084 A1 | 12/2017 | Cheng et al. |
| 2018/0006743 A1 | 1/2018 | Zhu et al. |
| 2018/0035430 A1 | 2/2018 | Futaki |
| 2018/0041312 A1 | 2/2018 | Li et al. |
| 2018/0048431 A1 | 2/2018 | Wang et al. |
| 2018/0198570 A1 | 7/2018 | Astely et al. |
| 2018/0279338 A1 | 9/2018 | Jiang et al. |
| 2018/0294943 A1 | 10/2018 | Hwang et al. |
| 2019/0007956 A1 | 1/2019 | Jiang et al. |
| 2019/0098622 A1 | 3/2019 | Lee et al. |
| 2019/0222364 A1 | 7/2019 | Shimoda et al. |
| 2019/0289602 A1 | 9/2019 | Mukkavilli et al. |
| 2019/0335481 A1 | 10/2019 | Jiang et al. |
| 2019/0373629 A1 | 12/2019 | Mukkavilli et al. |
| 2020/0367266 A1 | 11/2020 | Jiang et al. |
| 2021/0274498 A1 | 9/2021 | Mukkavilli et al. |

FOREIGN PATENT DOCUMENTS

| | | |
|---|---|---|
| CN | 101132262 A | 2/2008 |
| CN | 101179751 A | 5/2008 |
| CN | 101567773 A | 10/2009 |
| CN | 101836493 A | 9/2010 |
| CN | 102014514 A | 4/2011 |
| CN | 102150468 A | 8/2011 |
| CN | 102271016 A | 12/2011 |
| CN | 102404841 A | 4/2012 |
| CN | 102437901 A | 5/2012 |
| CN | 102611525 A | 7/2012 |
| CN | 102687451 A | 9/2012 |
| CN | 101389120 B | 12/2012 |
| CN | 103190192 A | 7/2013 |
| CN | 103716143 A | 4/2014 |
| CN | 103825671 A | 5/2014 |
| CN | 103840931 A | 6/2014 |
| CN | 103858498 A | 6/2014 |
| CN | 103973397 A | 8/2014 |
| CN | 103973417 A | 8/2014 |
| CN | 104170294 A | 11/2014 |
| CN | 104218956 A | 12/2014 |
| CN | 104348582 A | 2/2015 |
| CN | 104348589 A | 2/2015 |
| CN | 104348602 A | 2/2015 |
| CN | 107534899 A | 1/2018 |
| EP | 2836044 A1 | 2/2015 |
| EP | 2947792 A1 | 11/2015 |
| EP | 3291599 A1 | 3/2018 |
| JP | 2011503975 A | 1/2011 |
| JP | 2012175258 A | 9/2012 |
| JP | 2013517639 A | 5/2013 |
| JP | 2013544473 A | 12/2013 |
| JP | 2014500685 A | 1/2014 |
| JP | 2014516231 A | 7/2014 |
| JP | 2014222923 A | 11/2014 |
| KR | 20100138852 A | 12/2010 |
| KR | 20120052971 A | 5/2012 |
| KR | 20140012658 A | 2/2014 |
| KR | 20140073534 A | 6/2014 |
| KR | 20140077606 A | 6/2014 |
| KR | 20140096433 A | 8/2014 |
| KR | 20150013458 A | 2/2015 |
| KR | 20150013561 A | 2/2015 |
| KR | 20150052002 A | 5/2015 |
| TW | I456936 B | 10/2014 |
| TW | 201446052 A | 12/2014 |
| TW | 201507415 A | 2/2015 |
| TW | I477175 B | 3/2015 |
| WO | WO-2004064295 A2 | 7/2004 |
| WO | WO-2008028006 | 3/2008 |
| WO | 2008042541 A1 | 4/2008 |
| WO | WO-2009022391 A1 | 2/2009 |
| WO | WO-2009100069 A2 | 8/2009 |
| WO | WO-2009124079 A1 | 10/2009 |

(56) References Cited

FOREIGN PATENT DOCUMENTS

| | | |
|---|---|---|
| WO | WO-2010118371 A1 | 10/2010 |
| WO | 2011011636 A2 | 1/2011 |
| WO | WO-2011019223 A2 | 2/2011 |
| WO | 2011052961 A2 | 5/2011 |
| WO | WO-2011071944 | 6/2011 |
| WO | WO-2011140109 A1 | 11/2011 |
| WO | 2011163265 A1 | 12/2011 |
| WO | WO-2012024141 A1 | 2/2012 |
| WO | WO-2012068141 A1 | 5/2012 |
| WO | WO-2012102739 A1 | 8/2012 |
| WO | WO-2012168092 A1 | 12/2012 |
| WO | WO-2013015587 A2 | 1/2013 |
| WO | WO-2013025502 A2 | 2/2013 |
| WO | WO-2013110228 A1 | 8/2013 |
| WO | WO-2013112320 A1 | 8/2013 |
| WO | WO-2013157894 A1 | 10/2013 |
| WO | WO-2013175181 A1 | 11/2013 |
| WO | WO-2013176597 A1 | 11/2013 |
| WO | WO-2014003104 A1 | 1/2014 |
| WO | WO-2014067140 A1 | 5/2014 |
| WO | WO-2014112802 A1 | 7/2014 |
| WO | WO-2014179964 A1 | 11/2014 |
| WO | WO-2015048361 A1 | 4/2015 |
| WO | WO-2016148876 A1 | 9/2016 |
| WO | WO-2016148877 A1 | 9/2016 |
| WO | WO-2016148878 | 9/2016 |
| WO | WO-2016149292 A1 | 9/2016 |
| WO | 2016175015 A1 | 11/2016 |
| WO | WO-2016187060 A1 | 11/2016 |
| WO | 2017123276 A1 | 7/2017 |

OTHER PUBLICATIONS

Levanen T., et al., "Dense Small-Cell Networks: Rethinking the Radio Interface Beyond LTE-Advanced", 1st International Conference on 5G for Ubiquitous Connectivity, ICST, Nov. 26, 2014 (Nov. 26, 2014), pp. 163-169, XP032735039, DOI: 10.4108/ICST.5GU. 2014.258115 [retrieved on Feb. 11, 2015].
Taiwan Search Report—TW105120024—TIPO—dated Aug. 27, 2018.
Huawei, et al., "Discussion on new Frame Structure for Latency Reduction in TDD", 3GPP TSG RAN WG1 Meeting #84, R1-160754, St. Julian's, Malta, Feb. 15-19, 2016, 9 Pages.
Qualcomm Incorporated: "Summary of Email Discussion on Frame Structure", 3GPP Draft; R1-165456_Frame_Structure_Discussion, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 24, 2016 (May 24, 2016), pp. 1-28, XP051104210, Retrieved from the Internet: URL: http://www.3gpp.org/ftp/Meetings_3GPP SYNC/RAN1/Docs/ [retrieved on May 24, 2016].
Smee J.E., "5G Design Across Services", May 12, 2015 (May 12, 2015), XP055299081, 23 Pages, Retrieved from the Internet: URL: https://johannesbergsummit.com/wp-content/uploads/sites/6/2014/11/Tuesday_3_John-Smee.pdf [retrieved on Aug. 31, 2016].
Taiwan Search Report—TW107134769—TIPO—dated May 16, 2020.
3GPP 36.211, "3rd Generation Partnership Project, Technical Specification Group Radio Access Network, Evolved Universal Terrestrial Radio Access (E-UTRA), Physical Channels and Modulation (Release 8)", 3GPP Standard, V8.5.0, Dec. 1, 2008 (Dec. 1, 2008), pp. 1-82, XP050377537.
"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V12.4.0, Jan. 3, 2015 (Jan. 3, 2015), pp. 1-124, XP050927386, [retrieved on Jan. 3, 2015] chapter 1 "scope" chapter 4 "Frame structure".

CATT: "ACK/NACKs Transmission in UpPTS", Agenda Item: 6.1.7,R1-080175, 3GPP TSG RAN WG1 meeting #51 bis, Sevilla, Spain, Jan. 14-18, 2008, 7 pages.
"Chapter 12: Retransmission Protocols" In: Erik Dahlman: "4G LTE/LTE-Advanced for Mobile Broadband", Nov. 30, 2013 (Nov. 30, 2013), Academic Press, XP002758475, pp. 299-319, Sections 12.1, 12.1.3.2.
Chen S., "A Novel TD-LTE Frame Structure for Heavy Uplink Traffic in Smart Grid", 2014 IEEE Innovative Smart Grid Technologies—Asia (ISGT ASIA), May 23, 2014, pp. 158-163.
Co-pending U.S. Appl. No. 15/857,543, filed Dec. 28, 2017.
Co-pending U.S. Appl. No. 15/857,571, filed Dec. 28, 2017.
Eeva L., et al., "Achieving Low Latency and Energy Consumption by 5G TDD Mode Optimization," 2014 IEEE International Conference on Communications Workshops (ICC), IEEE, Jun. 10, 2014 (Jun. 10, 2014), pp. 1-6, XP032630839, Doi: 10.1109/ICCW.2014. 6881163 [retrieved on Aug. 20, 2014].
Ericsson: "Usage of DwPTS", 3GPP TSG-RAN WG1 #51 bis, Agenda Item: 6.1.7,R1-080347, Sevilla, Spain, Jan. 14-18, 2008, 3 pages.
JPO Appeal Decision for JP Application No. 2017-559010 (Appeal No. 2018-13500) dated Aug. 26, 2019 (original Japanese language document provided by Japanese Patent Office; English-language translation provided by JP counsel).
Lahetkangas E., et al., "On the TDD Subframe Structure for Beyond 4G Radio Access Network", 2013 Future Network & Mobile Summit, Article No. 6633569, Jul. 3, 2013 (Jul. 3, 2013), pp. 1-10, 20130705, XP055335904, Title; Section 3; Figures 3, 6-7.
Levanen T., et al., "Low Latency Radio Interface for 5G Flexible TDD Local Area Communications", 2014 IEEE International Conference on Communications Workshops (ICC), IEEE, Jun. 10, 2014 (Jun. 10, 2014), pp. 7-13, XP032630785, DOI: 10.1109/ICCW.2014. 6881164 [retrieved on Aug. 20, 2014] the whole document.
Levanen T., et al., "Radio Interface Design for Ultra-Low Latency Millimeter-Wave Communications in 5G Era", IEEE GLOBECOM Workshops, Dec. 8-12, 2014, pp. 1420-1426.
Levanen T.A., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415, https://ieeexplore.ieee.org/stamp/stamp.jsp?tp=arnumber=6891105, Section V; figures 2,4; tables 8,12, Section VI.A; figure 5.
Lu Y., et al., "Uplink Control for Low Latency HARQ in TDD Carrier Aggregation", 2012 IEEE 75th Vehicular Technology Conference (VTC Spring), IEEE, May 6, 2012 (May 6, 2012), pp. 1-5, XP032202607, DOI: 10.1109A/ETECS.2012.6240190, ISBN: 978-1-4673-0989-9, abstract Section I; p. 1.
Mediatek Inc: "Discussions on UL HARQ for Rel-13 MTC UE", 3GPP Draft, R1-150675 Discussions on UL HARQ for Rel-13 MTC UE, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 9, 2015-Feb. 13, 2015 Feb. 8, 2015 (Feb. 8, 2015), pp. 1-5, XP050933875, Retrieved from the Internet: http://www.3gpp.org/ftp/Meetings_3GPP_SYNC/RAN1/Docs/ [retrieved on Feb. 8, 2015] Section 2.
NEC Group: "UL&DL Timing Coupling Issue for TDD elMTA System", Agenda Item: 7.2.3.3,R1-133341, 3GPP TSG RAN WG1 Meeting #74, Barcelona, Spain, Aug. 19-23, 2013, 4 pages.
Nokia: "On HARQ/Scheduling Timing and Self-Contained Operation", 3GPP TSG-RAN WG1 #86 Bis, R1-1609742, Lisbon, Portugal, Oct. 10-14, 2016, 6 Pages.
Pedersen K., et al., "A Flexible Frame Structure for 5G Wide Area", 2015 IEEE 82nd Vehicular Technology Conference (VTC 2015-FALL), Sep. 6, 2015, pp. 1-5, XP032856972, DOI: 10.1109/VTCFALL.2015.7390791 [retrieved on Jan. 25, 2016], 5 pages.
Popovski P., et al., "Deliverable D2.3 Components of a new air interface- building blocks and performance," Mobile and wireless communications Enablers for the Twenty-twenty Information Society, ICT-317669-METIS/D2.3, 2014, p. 117.
Popovski P., et al., "Deliverable D2.4 Proposed solutions for new radio access," Mobile and wireless communications Enablers for the Twenty-twenty Information Society, IICT-317669-M ETIS/D2. 4, 2015, p. 190.

(56) References Cited

OTHER PUBLICATIONS

Qualcomm, Number of HARQ Interlaces Defined UE Category for Self-contained TDD Subframe, Jun. 8, 2014, 8 pages.

Qualcomm Technologies Inc: "The 5G Unified Air Interface Scalable to an Extreme Variation of Requirements", Nov. 2015, 46 pages.

Soret B., et al., "Fundamental Tradeoffs among Reliability, Latency and Throughput in Cellular Networks," IEEE Proceedings of GLOBECOM, Dec. 2014, pp. 1391-1396.

Texas Instruments: "TDD System Evaluation of Multi-Bit ACK/NAK and ACK/NAK Bundling", Agenda Item: 6.3,R1-083128, 3GPP TSG RAN WG1 #54, Jeju, South Korea, Aug. 18-22, 2008, 4 pages.

Tiedemann E., et al., "5G: The Next Generation (Big Wave) of Wireless," Jul. 22, 2015 (Jul. 22, 2015), XP055280307, Retrieved from the Internet URL:https://www.nttdocomo.co.jp/binary/pdf/corporate/technology/rd/tech/5g/NTTDOCOMO 5G TBD lecture6.pdf.

ZTE: "Issues About Data Transmission in TDD-eIMTA", 3GPP Draft, R1-132108 Issues About Data Transmission In TDD-eIMTA, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 20, 2013-May 24, 2013 May 11, 2013 (May 11, 2013), pp. 1-4, XP050697886, Retrieved from the Internet: URL: http://www.3gpp.org/ftp/tsg_ran/WG1_RL1/TSGR1_73/Docs/ [retrieved on May 11, 2013] the whole document.

Ericsson et al., "CSI Feedback Signaling Feedback",R1-103840, 3GPP TSG-RAN WG1 61 bis, Dresden, Germany, Jun. 28-Jul. 2, 2010, Jun. 22, 2010, 4 Pages.

ETRI: "Discussion on HARQ Operation for LAA", [Online] Feb. 8, 2015 (Feb. 8, 2015), 3GPP Draft, 3GPP TSG RAN WG1 Meeting #80, R1-150633-Discussion on HARQ Operation For LAA, 3rd Generation Partnership Project (3GPP), Mobile Competence Centre, 650, Route Des Lucioles, F-06921 Sophia-Antipolis Cedex, France, , vol. RAN WG1, No. Athens, Greece, Feb. 9, 2013-Feb. 13, 2019 XP050933836, pp. 1-12, Retrieved from the Internet: URL:http://www.3gpp.org/ftp/Meetings_3GPP_SYNC/RAN1/Docs/,[retrieved on Feb. 8, 2015] the whole document, Section 3.3, p. 1 - p. 4.

ETSI MCC: "Report of RAN2 RAN2 #87bis", R2-144750, 3GPP TSG-RAN Working Group 2 meeting #88, San Francisco, USA, Nov. 16-21, 2014, 124 Pages,.

Jiafan W., "TD-SCDMA Base Station Lub Interface Design and Implementation of Protocol Software", China Excellent Master Degree Thesis Full-text database, Nov. 30, 2019.

Taiwan Search Report—TW109145440—TIPO—dated Jun. 1, 2022.

\* cited by examiner

TIME DIVISION DUPLEX (TDD) SUBFRAME STRUCTURE SUPPORTING SINGLE AND MULTIPLE INTERLACE MODES

PRIORITY CLAIM

The present application for patent is a continuation of Non-Provisional application Ser. No. 15/994,863 filed in the U.S. Patent and Trademark Office on May 31, 2018, the entire content of which is incorporated herein by reference as if fully set forth below in its entirety and for all purposes. Non-Provisional application Ser. No. 15/994,863 is a continuation application of Ser. No. 15/051,949 filed in the U.S. Patent and Trademark Office on Feb. 24, 2016, the entire content of which is incorporated herein by reference as if fully set forth below in its entirety and for all applicable purposes. Non-Provisional application Ser. No. 15/051,949 claims priority to and the benefit of Provisional Application No. 62/194,710 filed in the U.S. Patent and Trademark Office on Jul. 20, 2015, the entire content of which is incorporated herein by reference as if fully set forth below in its entirety and for all applicable purposes.

TECHNICAL FIELD

Aspects of the present disclosure relate generally to wireless communication systems, and more particularly, to supporting single and multiple interlace modes in a time division duplex (TDD) subframe structure.

BACKGROUND

Wireless communication networks are widely deployed to provide various communication services such as telephony, video, data, messaging, broadcasts, and so on. Typical wireless communication systems may employ multiple-access technologies capable of supporting communication with multiple users by sharing available system resources (e.g., bandwidth, transmit power). Examples of multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Examples of telecommunication standards include Long Term Evolution (LTE) and LTE-Advanced (LTE-A), which include a set of enhancements to the Universal Mobile Telecommunications System (UMTS) mobile standard promulgated by Third Generation Partnership Project (3GPP). LTE-A is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

However, as the demand for mobile broadband access continues to increase, there exists a need for further improvements in multiple access technology. For example, the spectrum allocated to wireless communication networks employing multiple access technology is being (or is expected to be) allocated in such a way that paired carriers, utilized in many existing frequency division duplex (FDD) systems, are either not available, or not available in matched bandwidth configurations. Accordingly, time division duplex (TDD) carriers are expected to be utilized in many future deployments for wireless communication systems.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide a time division duplex (TDD) subframe structure that supports both a single interlace mode of operation and a multiple interlace mode of operation. In the single interlace mode of operation, control information, data information corresponding to the control information and acknowledgement information corresponding to the data information are included in a single subframe. In the multiple interlace mode of operation, at least one of the control information, the data information corresponding to the control information or the acknowledgement information corresponding to the data information is included in a different subframe. Both single and multiple interlace modes can be multiplexed together within the TDD subframe structure.

In one aspect, the disclosure provides a method of wireless communication in a wireless communication network for a subordinate entity to communicate with a scheduling entity. The method includes receiving first control information in a first control portion of a first subframe of a plurality of subframes. Each of the plurality of subframes includes a plurality of symbols. Each of the plurality of symbols associated with a transmission direction including a same subcarrier spacing for the respective transmission direction across each of the plurality of subframes. The first control information includes a first downlink assignment for the subordinate entity. The method further includes receiving first data corresponding to the first downlink assignment in a first data portion of a second subframe subsequent to the first subframe, and transmitting first acknowledgement information corresponding to the first data in a first acknowledgement portion of the second subframe.

Another aspect of the disclosure provides a user equipment in a wireless communication network. The user equipment includes a transceiver in wireless communication with a base station, a memory, and a processor communicatively coupled to the transceiver and the memory. The processor is configured to receive first control information in a first control portion of a first subframe of a plurality of subframes. Each of the plurality of subframes includes a plurality of symbols. Each of the plurality of symbols associated with a transmission direction including a same subcarrier spacing for the respective transmission direction across each of the plurality of subframes. The first control information includes a first downlink assignment for the subordinate entity. The processor is further configured to receive first data corresponding to the first downlink assignment in a first data portion of a second subframe subsequent to the first subframe, and transmit first acknowledgement information corresponding to the first data in a first acknowledgement portion of the second subframe.

Another aspect of the disclosure provides an apparatus configured for wireless communication. The apparatus includes means for receiving first control information in a first control portion of a first subframe of a plurality of subframes. Each of the plurality of subframes includes a plurality of symbols. Each of the plurality of symbols associated with a transmission direction including a same subcarrier spacing for the respective transmission direction across each of the plurality of subframes. The first control information includes a first downlink assignment for the subordinate entity. The apparatus further includes means for receiving first data corresponding to the first downlink assignment in a first data portion of a second subframe subsequent to the first subframe, and means for transmitting first acknowledgement information corresponding to the first data in a first acknowledgement portion of the second subframe.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
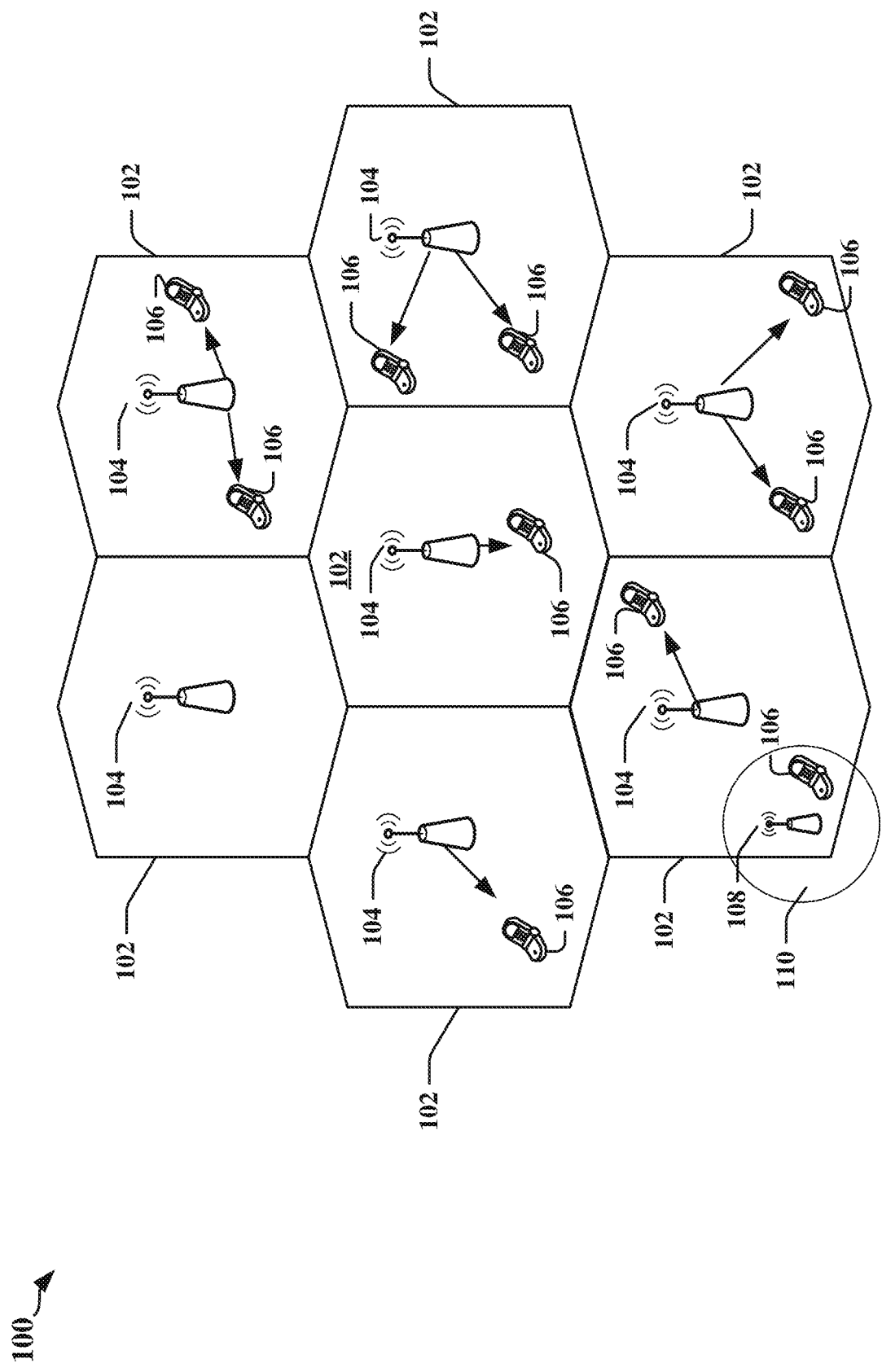
FIG. 1 is a diagram illustrating an example of a wireless communication network architecture.

The various concepts presented throughout this disclosure may be implemented across a broad variety of telecommunication systems, network architectures, and communication standards. In order to illustrate some of the entities or devices described throughout the present disclosure, FIG. 1 is a diagram illustrating a generalized example of a wireless communication network 100. In this example, the wireless communication network 100 is divided into a number of cellular regions (cells) 102. In the context of a multiple access network, channel resources may generally be scheduled, and each entity may be synchronous. That is, each node utilizing the network may coordinate its usage of the resources such that transmissions are only made during the allocated portion of the frame, and the time of each allocated portion is synchronized among the different nodes. One node in each cellular region 102/110 acts as a scheduling entity.

Each scheduling entity 104/108 may be a base station or access point, or a user equipment (UE) 106 in a device-to-device (D2D) and/or mesh network. The scheduling entity 104/108 manages the resources on the carrier and assigns resources to other users of the channel, including subordinate entities, such as one or more UEs 106 in the cellular network 100. The scheduling entities 104 are responsible for all radio related functions including radio bearer control, admission control, mobility control, scheduling, security, and connectivity to a centralized controller and/or gateway. There is no centralized controller in this example of a network 100, but a centralized controller may be used in alternative configurations.

One or more lower power class scheduling entities 108 may have a cellular region 110 that overlaps with one or more other cellular regions (cells) 102. The lower power class scheduling entity 108 may be a femto cell, pico cell, micro cell, remote radio head, or in some instances, another UE 106. The macro scheduling entities 104 are each assigned to a respective cell 102 and are configured to provide an access point to a core network for all the UEs 106 in the cells 102.

The modulation and multiple access scheme employed by the network 100 may vary depending on the particular telecommunications standard being deployed. In some radio access networks, such as those defined in LTE standards, orthogonal frequency division multiplexing (OFDM) is used on the downlink (DL) and single carrier frequency division multiple access (SC-FDMA) is used on the uplink (UL) to support both frequency division duplexing (FDD) and time division duplexing (TDD). As those skilled in the art will readily appreciate from the detailed description to follow, the various concepts presented herein are well suited for various applications including telecommunication standards employing other modulation and multiple access techniques. By way of example, these concepts may be employed in 5G, LTE, or Evolution-Data Optimized (EV-DO). EV-DO is an air interface standard promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 is described in documents from the 3GPP2 organization. The actual wireless communication standard and the multiple access technology employed will depend on the specific application and the overall design constraints imposed on the system.

The scheduling entities 104 may have multiple antennas supporting MIMO technology. The use of MIMO technology enables the scheduling entities 104 to exploit the spatial domain to support spatial multiplexing, beamforming, and transmit diversity. Spatial multiplexing may be used to transmit different streams of data simultaneously on the same frequency. The data steams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the downlink (DL). The spatially precoded data streams arrive at the UE(s) 106 with different spatial signatures, which enables each of the UE(s) 106 to recover the one or more data streams destined for that UE 106. On the uplink (UL), each UE 106 transmits a spatially precoded data stream, which enables the scheduling entity 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Certain aspects of a wireless communication network described herein may relate to a system supporting OFDM on the DL. OFDM is a spread-spectrum technique that modulates data over a number of subcarriers within an OFDM symbol. The subcarriers are spaced apart at precise frequencies. The spacing provides orthogonality that enables a receiver to recover the data from the subcarriers. In the time domain, a guard interval (e.g., cyclic prefix) may be added to each OFDM symbol to combat inter-OFDM-symbol interference. In some examples, the UL may use SC-FDMA in the form of a Discrete Fourier Transform (DFT)-spread OFDM signal to compensate for high peak-to-average power ratio (PAPR). However, those of ordinary skill in the art will recognize that any suitable modulation and multiple access scheme may be utilized for uplink and downlink communication.

Figure 2:
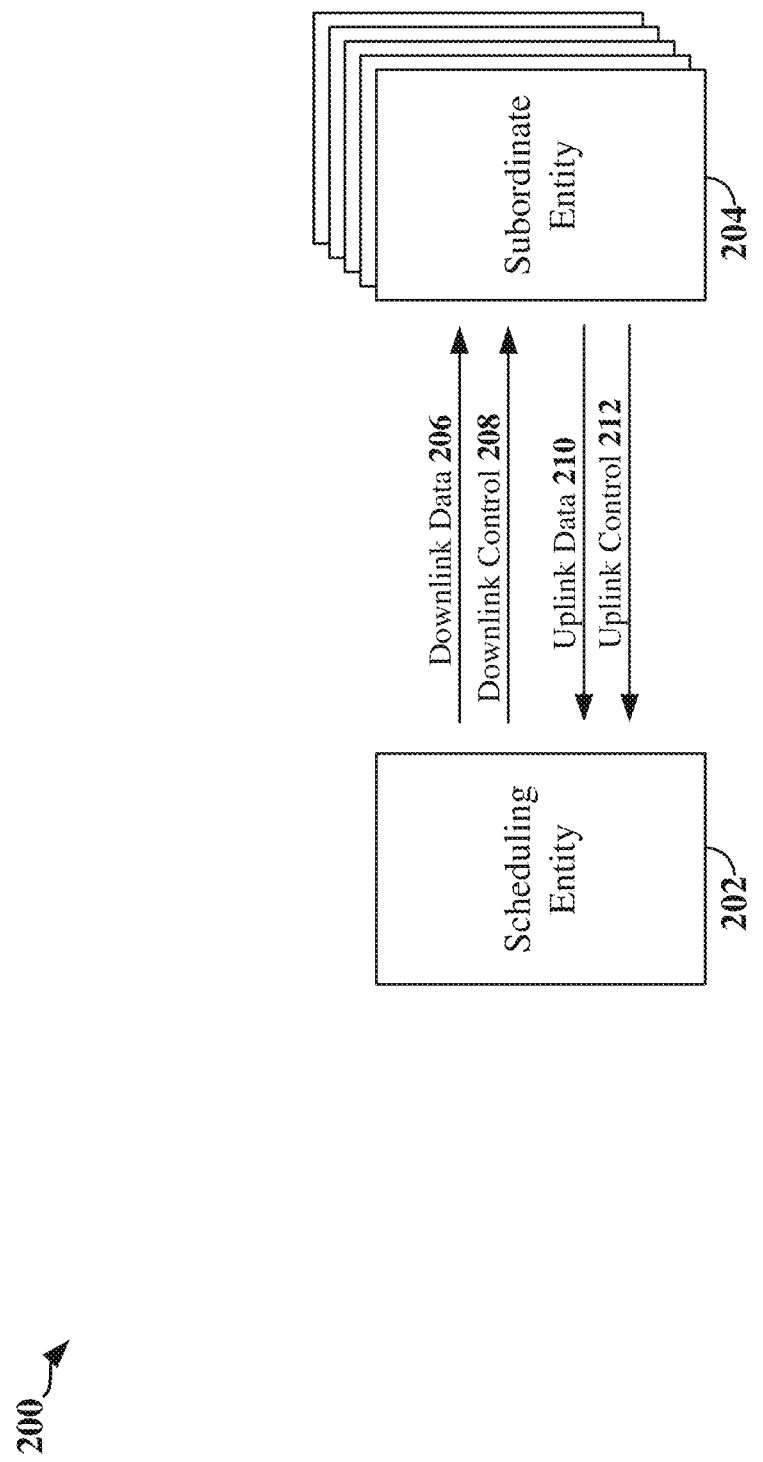
FIG. 2 is a block diagram conceptually illustrating an example of a scheduling entity communicating with one or more subordinate entities according to some embodiments.

Referring now to FIG. 2, a block diagram illustrates an exemplary scheduling entity 202 in wireless communication with a plurality of subordinate entities 204. The scheduling entity 202 transmits downlink data channel(s) 206 and downlink control channel(s) 208, while the subordinate entities 204 transmit uplink data channel(s) 210 and uplink control channel(s) 212. Of course, the channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other control and feedback channels.

In accordance with aspects of the present disclosure, the term downlink (DL) may refer to a point-to-multipoint transmission originating at the scheduling entity 202. In addition, the term uplink (UL) may refer to a point-to-point transmission originating at a subordinate entity 204.

Broadly, the scheduling entity 202 is a node or device responsible for scheduling traffic in a wireless communication network, including the downlink transmissions and, in some examples, uplink data 210 from one or more subordinate entities 204 to the scheduling entity 202. A scheduling entity 202 may be, or may reside within, a base station, a network node, a user equipment (UE), an access terminal, or any suitable node or peer in a wireless communication network.

Broadly, the subordinate entity 204 is a node or device that receives scheduling control information, including but not limited to scheduling grants, synchronization or timing information, or other control information from another entity in the wireless communication network such as the scheduling entity 202. A subordinate entity may be, or may reside within, a base station, a network node, a UE, an access terminal, or any suitable node or peer in a wireless communication network.

As illustrated in FIG. 2, the scheduling entity 202 may transmit downlink data 206 to one or more subordinate entities 204. In addition, the subordinate entities 204 may transmit uplink data 210 to the scheduling entity 202. In accordance with aspects of the disclosure, the uplink data 210 and/or downlink data 206 may be transmitted in transmission time intervals (TTIs). As used herein, the term TTI refers to the period in which a block of data, corresponding to the smallest collection of symbols to be processed at the Media Access Control (MAC) layer and above, is transferred by the physical layer onto the radio interface. In accordance with aspects of the disclosure, a TTI is equal to the duration of a subframe. Thus, as further used herein, the term subframe refers to an encapsulated set of information sent within a single TTI that is capable of being independently decoded. In various aspects, multiple subframes are grouped together to form a single frame. For example, in LTE, the TTI (subframe duration) is set to 1 ms, whereas the frame duration is set to 10 ms, corresponding to 10 subframes. However, within the scope of the present disclosure, a subframe may have a duration of 250 µs, 500 µs, 1 ms, or any suitable duration. Similarly, any suitable number of subframes may occupy a frame. Frames are generally utilized by upper Open Systems Interconnection (OSI) layers for synchronization and other purposes.

In one example, the scheduling entity 202 may multiplex downlink data for a set of subordinate entities (i.e., two or more subordinate entities) within a single subframe. For example, the scheduling entity 202 may multiplex downlink data to the set of subordinate entities using time division multiplexing, frequency division multiplexing (e.g., OFDM), code division multiplexing, and/or any suitable multiplexing scheme known to those of ordinary skill in the art. Likewise, any suitable multiple access scheme may be utilized to combine uplink data from multiple subordinate entities 204 within a single subframe.

The scheduling entity 202 may further broadcast downlink control channel(s) 208 to one or more subordinate entities 204. The downlink control channel(s) 208 may include in some examples a physical downlink control channel (PDCCH), a physical downlink shared channel (PDSCH) and/or any other control channels or pilots, such as the Channel State Information-Reference Signal (CSI-RS) pilot. In still a further example, the downlink control channel(s) 208 may include acknowledgement information (e.g., acknowledged (ACK)/not acknowledged (NACK) packets) indicating whether the uplink data 210 in one or more subframes was received correctly at the scheduling entity 202. For example, a data packet may include verification bits, such as a checksum and/or a cyclic redundancy check (CRC). Accordingly, a device receiving a data packet may receive and decode the data packet and verify the integrity of the received and decoded packet in accordance with the verification bits. When the verification succeeds, a positive acknowledgment (ACK) may be transmitted; whereas when the verification fails, a negative acknowledgment (NACK) may be transmitted.

Furthermore, each of the subordinate entities 204 may transmit uplink control channel(s) 212 to the scheduling entity 202. The uplink control channel(s) 212 may include in some examples a physical uplink control channel (PUCCH), random access channel (RACH), scheduling request (SR), sounding reference signal (SRS), channel quality indicator (CQI), channel state feedback information, buffer status information, or any other suitable control information or signaling. In an aspect of the disclosure, the uplink control channel(s) 212 may include a request for the scheduling entity 202 to schedule uplink transmissions. Here, in response to the request transmitted on the uplink control channel(s) 212, the scheduling entity 202 may transmit in the downlink control channel(s) 208 information that may schedule the TTI with uplink packets. In still a further example, the uplink control channel(s) 212 may include acknowledgement information (e.g., acknowledged (ACK)/not acknowledged (NACK) packets) indicating whether the downlink data 206 in one or more subframes was received correctly at the subordinate entity 204.

Figure 3:
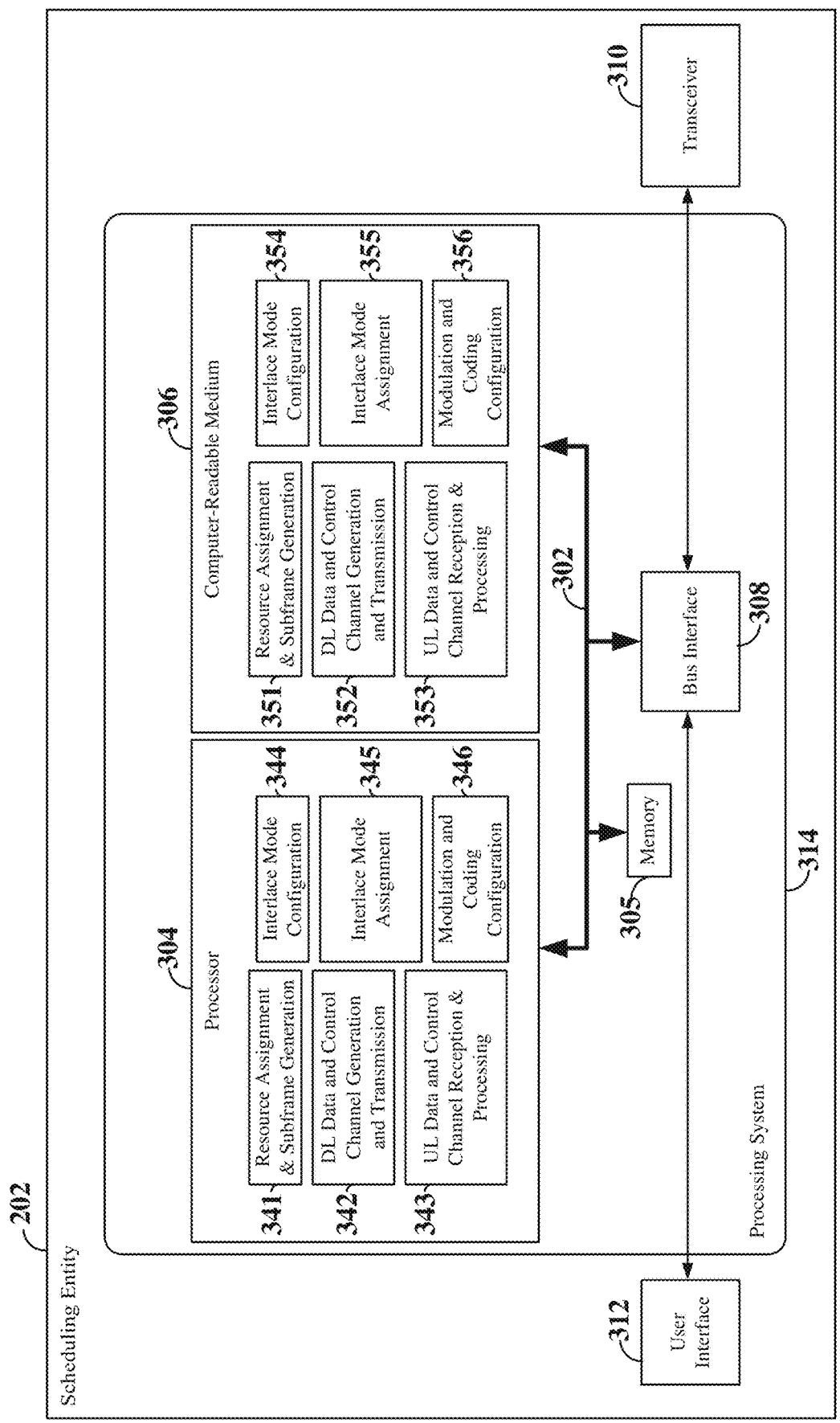
FIG. 3 is a block diagram illustrating an example of a hardware implementation for a scheduling entity employing a processing system according to some embodiments.

FIG. 3 is a conceptual diagram illustrating an example of a hardware implementation for a scheduling entity 202 employing a processing system 314. In accordance with various aspects of the disclosure, an element, or any portion of an element, or any combination of elements may be implemented with a processing system 314 that includes one or more processors 304.

In various aspects of the disclosure, the scheduling entity 202 may be any suitable radio transceiver apparatus, and in some examples, may be embodied in a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. Within the present document, a base station may be referred to as a scheduling entity, indicating that the base station provides scheduling information to one or more subordinate entities. Such a base station may provide a wireless access point to a core network for any number of subordinate entities.

In other examples, the scheduling entity 202 may be embodied by a wireless user equipment (UE). Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a UE may be referred to either as a scheduling entity, or a subordinate entity. That is, in various aspects of the present disclosure, a wireless UE may operate as a scheduling entity providing scheduling information to one or more subordinate entities, or may operate as a subordinate entity, operating in accordance with scheduling information provided by a scheduling entity.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a scheduling entity 202, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

In some aspects of the disclosure, the processor 304 may include resource assignment and subframe generation circuitry 341, configured to generate, schedule, and modify a resource assignment or grant of time-frequency resources. For example, the resource assignment and subframe control circuitry 341 may generate one or more time division duplex (TDD) subframes, each including time-frequency resources assigned to carry data and/or control information to and/or from multiple subordinate entities. The resource assignment and subframe generation circuitry 341 may operate in coordination with resource assignment and subframe generation software 351.

The processor 304 may further include downlink (DL) data and control channel generation and transmission circuitry 342, configured to generate and transmit downlink data and control channels. The DL data and control channel generation and transmission circuitry 342 may operate in coordination with the resource assignment and subframe control circuitry 341 to schedule the DL data and/or control information and to place the DL data and/or control information onto a time division duplex (TDD) carrier within one or more subframes generated by the resource assignment and subframe generation circuitry 341 in accordance with the resources assigned to the DL data and/or control information. The DL data and control channel generation and transmission circuitry 342 may further operate in coordination with DL data and control channel generation and transmission software 352.

The processor 304 may further include uplink (UL) data and control channel reception and processing circuitry 343, configured to receive and process uplink control channels and uplink data channels from one or more subordinate entities. In some examples, the UL data and control channel reception and processing circuitry 343 may be configured to receive scheduling requests from one or more subordinate entities, the scheduling requests being configured to request a grant of time-frequency resources for uplink user data transmissions. In other examples, the UL data and control channel reception and processing circuitry 343 may be configured to receive and process acknowledgement information (e.g., acknowledged/not acknowledged packets) from one or more subordinate entities. The UL data and control channel reception and processing circuitry 343 may operate in coordination with the resource assignment and subframe generation circuitry 341 to schedule UL data transmissions, DL data transmissions and/or DL data retransmissions in accordance with the received UL control channel information. The UL data and control channel reception and processing circuitry 343 may further operate in coordination with UL data and control channel reception and processing software 353.

The processor 304 may further include interlace mode configuration circuitry 344, configured for providing at least a single interlace mode of operation, in which control, data and acknowledgement information is self-contained within a single TTI (or TDD subframe), and a multiple interlace mode of operation, in which the control, data and acknowledgement information are contained within two or more TTIs (or TDD subframes) in an interlaced manner.

In the single interlace mode of operation, a self-contained TDD subframe structure is utilized by the resource assignment and subframe control circuitry 341 to generate one or more self-contained subframes. In each self-contained subframe, the control/scheduling information provides control/scheduling for all of the data packets within the subframe and the acknowledgement information includes acknowledgement/not acknowledgement (ACK/NACK) signals for all of the data packets within the subframe. Therefore, the self-contained subframe structure may include transmissions in both the uplink and the downlink directions.

In some examples, the self-contained TDD subframe structure includes DL control (scheduling) information, DL data information corresponding to the scheduling information and UL acknowledgement information corresponding to the data information. In other examples, the self-contained subframe structure includes DL control (scheduling) information, UL data information corresponding to the scheduling information and DL acknowledgement information corresponding to the data information.

In an aspect of the disclosure, a hybrid automatic repeat request (HARQ) retransmission scheme is used to retransmit data incorrectly received. Although the single interlace mode supports single HARQ interlace processing at the physical layer to enable high data rates in extreme bandwidth cases with a reasonable HARQ buffer cost, when the throughput of a subordinate entity is not at peak and/or when there is limited link budget, the processing timeline may be too tight for the subordinate entity to turn around HARQ in the same self-contained subframe. For example, when the subordinate entity is located at the edge of the cell, there may be limited downlink control and uplink ACK link budgets due to limited bandwidth on the downlink and limited symbol duration on the uplink and downlink. These link budget limitations may prevent the subordinate entity from returning the ACK/NACK within the same subframe as data reception.

Processing and/or power constraints at the scheduling entity may also prevent the scheduling entity from completing retransmissions to one or more subordinate entities in the next subframe. For example, scheduling updates for the next subframe based on ACK/NACK signals received in a current subframe may require fast processing at the scheduling entity. If there is not sufficient time to decode all of the ACK/NACK signals before the next subframe, the scheduling entity may not be able to schedule all of the necessary retransmissions in the next subframe.

Therefore, to allow for longer processing time at the scheduling entity and/or subordinate entity, the interlace mode configuration circuitry 344 may further provide a multiple interlace mode of operation. In the multiple interlace mode of operation, two or more TDD subframes are utilized by the resource assignment and subframe generation circuitry 341 to transmit the control, data (or retransmitted data) and acknowledgement information. In various aspects of the disclosure, the multiple interlace mode enables at least one of the control, data, or ACK information to be transmitted in an interlaced manner between two or more TDD subframes. In some examples, the TDD subframe structure utilized in the multiple interlace mode of operation may be the same TDD subframe structure utilized in the single interlace mode of operation. However, the TDD subframe structure may not be entirely self-contained, such that one or more of the control, data, or ACK information may be transmitted in a different subframe.

In some examples, the multiple interlace mode of operation enables data retransmission to be delayed one or more subframes. Thus, instead of scheduling retransmissions in back-to-back subframes, retransmissions may be scheduled in subsequent subframes (e.g., every other subframe or any other delayed scheduling configuration). In other examples, the ACK/NACK information may be delayed one or more subframes (e.g., the ACK/NACK portion in a particular subframe may correspond to data transmitted in a previous subframe). In still other examples, the control information may be prescheduled, such that the control portion of a particular subframe may correspond to data transmitted in a subsequent subframe. Similar multiple interlace mode arrangements may be implemented for UL data transmissions and retransmissions. The interlace mode configuration circuitry 344 may operate in coordination with interlace mode configuration software 354.

The processor 304 may further include interlace mode assignment circuitry 345, configured to assign a scheduling mode selected from the single and multiple interlace modes to each subordinate entity. The scheduling mode assigned to a particular subordinate entity may depend on various factors, such as the throughput, buffer (e.g., hybrid automatic repeat request (HARQ) buffer size), and/or latency requirements of the subordinate entity, the power consumption and/or processing speed of the scheduling entity and/or the subordinate entity and the link budget of the uplink/downlink. The interlace mode assignment circuitry 345 may operate in coordination with interlace mode assignment software 355.

In an exemplary operation, the interlace mode assignment circuitry 345 may assign the single interlace mode of operation or the multiple interlace mode of operation to each subordinate entity for a current subframe based on the processing resources and/or constraints of the scheduling entity and/or subordinate entities, and in coordination with the interlace mode configuration circuitry 344, provide the parameters defining the assigned mode(s) of operation to the resource assignment and subframe generation circuitry 341 for generation of the current subframe. The resource assignment and subframe generation circuitry 341 may multiplex both single interlace subordinate entities and multiple interlace subordinate entities within the current TDD subframe.

The resource assignment and subframe generation circuitry 341 may further determine a TDD subframe structure for the current subframe. In some examples, the resource assignment and subframe generation circuitry 341 may determine whether the current subframe should include primarily uplink (UL) data information or primarily downlink (DL) data information. When the resource assignment and subframe generation circuitry 341 determines that the current subframe should include primarily DL data information, the resource assignment and subframe generation circuitry 341 provides a TDD subframe structure that includes a DL control (scheduling) portion, a DL data portion and an UL acknowledgement portion. When the resource assignment and subframe generation circuitry 341 determines that the current subframe should include primarily UL data information, the resource assignment and subframe generation circuitry 341 provides a TDD subframe structure that includes a DL control (scheduling) portion, an UL data portion and a DL acknowledgement portion. In the single interlace mode of operation, the TDD subframe structure is self-contained. However, in the multiple interlace mode of operation, the TDD subframe structure may enable at least one of the control, data, or ACK information to be transmitted in an interlaced manner between two or more TDD subframes.

Based on the subframe structure and selected modes of operation for each subordinate entity for the current subframe, the DL data and control channel generation and transmission circuitry 342 may populate the current subframe with control and/or data by preparing the control and/or data information in memory 305 and scheduling the control and/or data information via the resource assignment and subframe generation circuitry 341 for transmission according to the subframe structure and respective interlace modes of each subordinate entity. The DL data and control channel generation and transmission circuitry 342 may further coordinate with the UL data and control reception and processing circuitry 343 to generate the current subframe, as described below.

In an aspect of the disclosure, when the subframe structure includes a DL data portion, the DL data and control channel generation and transmission circuitry 342 may include DL control (scheduling) information in the control portion and DL data information in the data portion of the subframe. For example, the DL data and control channel generation and transmission circuitry 342 may include DL control (scheduling) information by preparing the control (scheduling) information in memory 305 and loading the control (scheduling) information from memory 305 into the DL control portion of the subframe. The DL data and control channel generation and transmission circuitry 342 may further include DL data information corresponding to the control information included in the current subframe (e.g., in the single interlace mode of operation) or in a previous subframe (e.g., in the multiple interlace mode of operation) by preparing the DL data information in memory 305 and loading DL data information from memory 305 into the DL data portion of the subframe. The control (scheduling) information may include control (scheduling) information for new DL data packets and retransmitted DL data packets. As an example, the DL data and control channel generation and transmission circuitry 342 may further carry hybrid automatic repeat request (HARQ) configuration information within the control (scheduling) information for retransmitted DL data packets by preparing the HARQ configuration information in memory 305 and loading the HARQ configuration information from memory 305 into the DL control portion of the current subframe. The UL data and control channel reception and processing circuitry 343 may then include acknowledgement information in the acknowledgement portion of the current subframe by receiving and processing ACK/NACK packets sent from one or more subordinate entities in the current subframe. The ACK/NACK packets may correspond to the DL data packets included in the current subframe (e.g., in the single interlace mode of operation) or in a previous subframe (e.g., in the multiple interlace mode of operation).

In an aspect of the disclosure in which the subframe structure includes an UL data portion, the DL data and control channel generation and transmission circuitry 342 may include DL control (scheduling) information in the control portion of the current subframe by preparing the DL control (scheduling) information in memory 305 and loading the control (scheduling) information from memory 305 into the DL control portion. The UL data and control channel reception and processing circuitry 343 may then include UL data information in the data portion of the current subframe by receiving and processing the UL data information sent from one or more subordinate entities. The UL data information may correspond to the control information included in the current subframe (e.g., in the single interlace mode of operation) or in a previous subframe (e.g., in the multiple interlace mode of operation). The DL data and control channel generation and transmission circuitry 342 may then include acknowledgement information corresponding to UL data information received in the current subframe (e.g., in the single interlace mode of operation) or in a previous subframe (e.g., in the multiple interlace mode of operation) by preparing the acknowledgement information (ACK/NACK packets) in memory 305 and loading the ACK/NACK packets from memory 305 into the acknowledgement portion of the current subframe.

The processor 304 may further include modulation and coding configuration circuitry 346, configured for determining a modulation and coding scheme (MCS) to utilize for downlink transmissions and/or a MCS for a subordinate entity to utilize for uplink transmissions. The modulation and coding configuration circuitry 346 may operate in coordination with modulation and coding configuration software 356.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
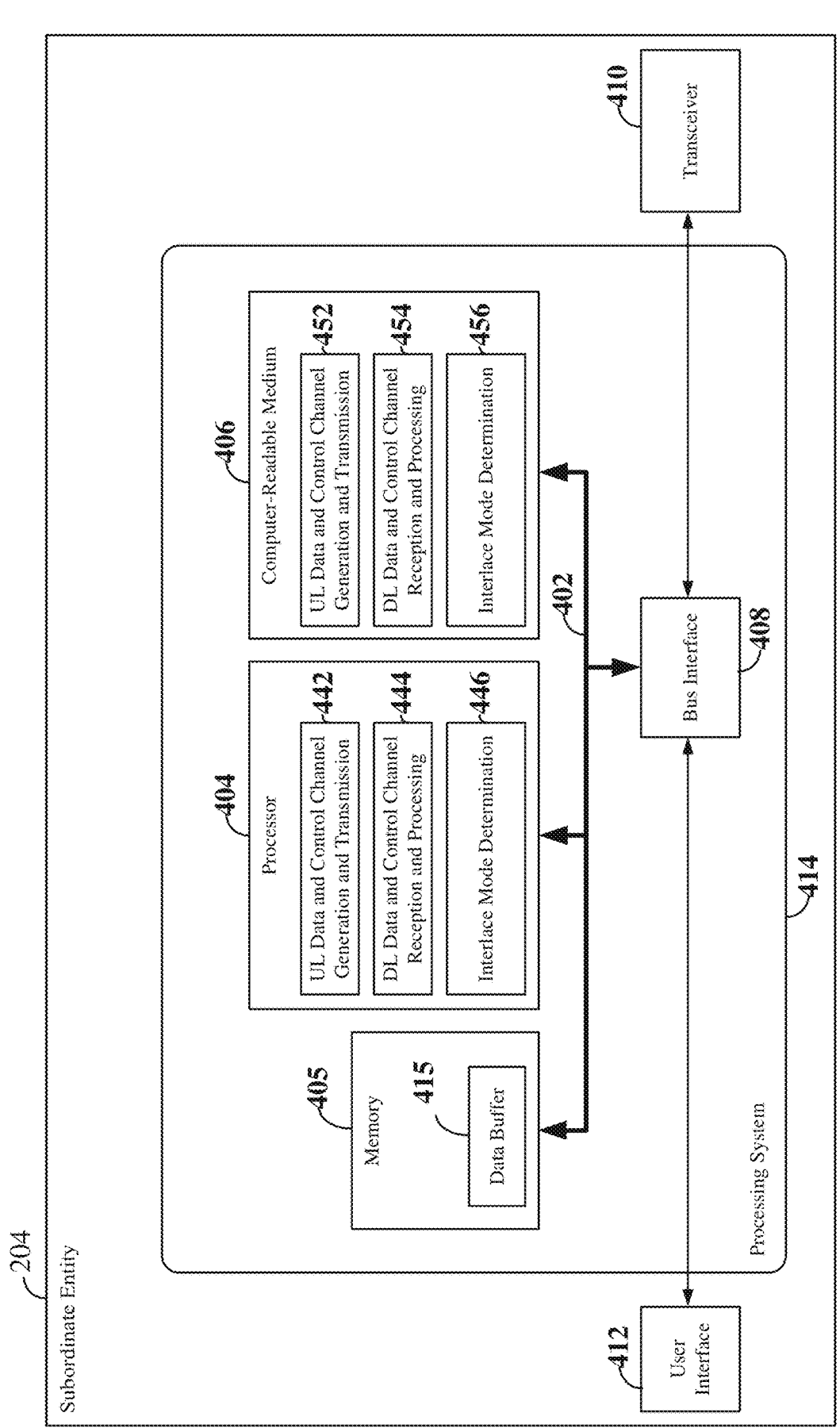
FIG. 4 is a block diagram illustrating an example of a hardware implementation for a subordinate entity employing a processing system according to some embodiments.

FIG. 4 is a conceptual diagram illustrating an example of a hardware implementation for an exemplary subordinate entity 204 employing a processing system 414. In accordance with various aspects of the disclosure, an element, or any portion of an element, or any combination of elements may be implemented with a processing system 414 that includes one or more processors 404.

The processing system 414 may be substantially the same as the processing system 314 illustrated in FIG. 3, including a bus interface 408, a bus 402, memory 405, a processor 404, and a computer-readable medium 406. Furthermore, the subordinate entity 204 may include a user interface 412 and a transceiver 410 substantially similar to those described above in FIG. 3. The processor 404, as utilized in a subordinate entity 204, may be used to implement any one or more of the processes described below.

In some aspects of the disclosure, the processor 404 may include uplink (UL) data and control channel generation and transmission circuitry 442, configured to generate and transmit uplink data on an UL data channel, and to generate and transmit uplink control/feedback/acknowledgement information on an UL control channel. The UL data and control channel generation and transmission circuitry 442 may operate in coordination with UL data and control channel generation and transmission software 452. The processor 404 may further include downlink (DL) data and control channel reception and processing circuitry 444, configured for receiving and processing downlink data on a data channel, and to receive and process control information on one or more downlink control channels. In some examples, received downlink data and/or control information may be temporarily stored in a data buffer 415 within memory 405. The DL data and control channel generation and transmission circuitry 444 may operate in coordination with DL data and control channel generation and transmission software 454.

The processor 404 may further include interlace mode determination circuitry 446, configured for requesting and/or determining an interlace mode assigned to the subordinate entity. In an aspect of the disclosure, the interlace mode determination circuitry 446 may request a multiple interlace mode of operation when the throughput of the subordinate entity is not at peak and/or when there is limited link budget. The interlace mode determination circuitry 446 may operate in coordination with the interlace mode determination software 456.

Figure 5:
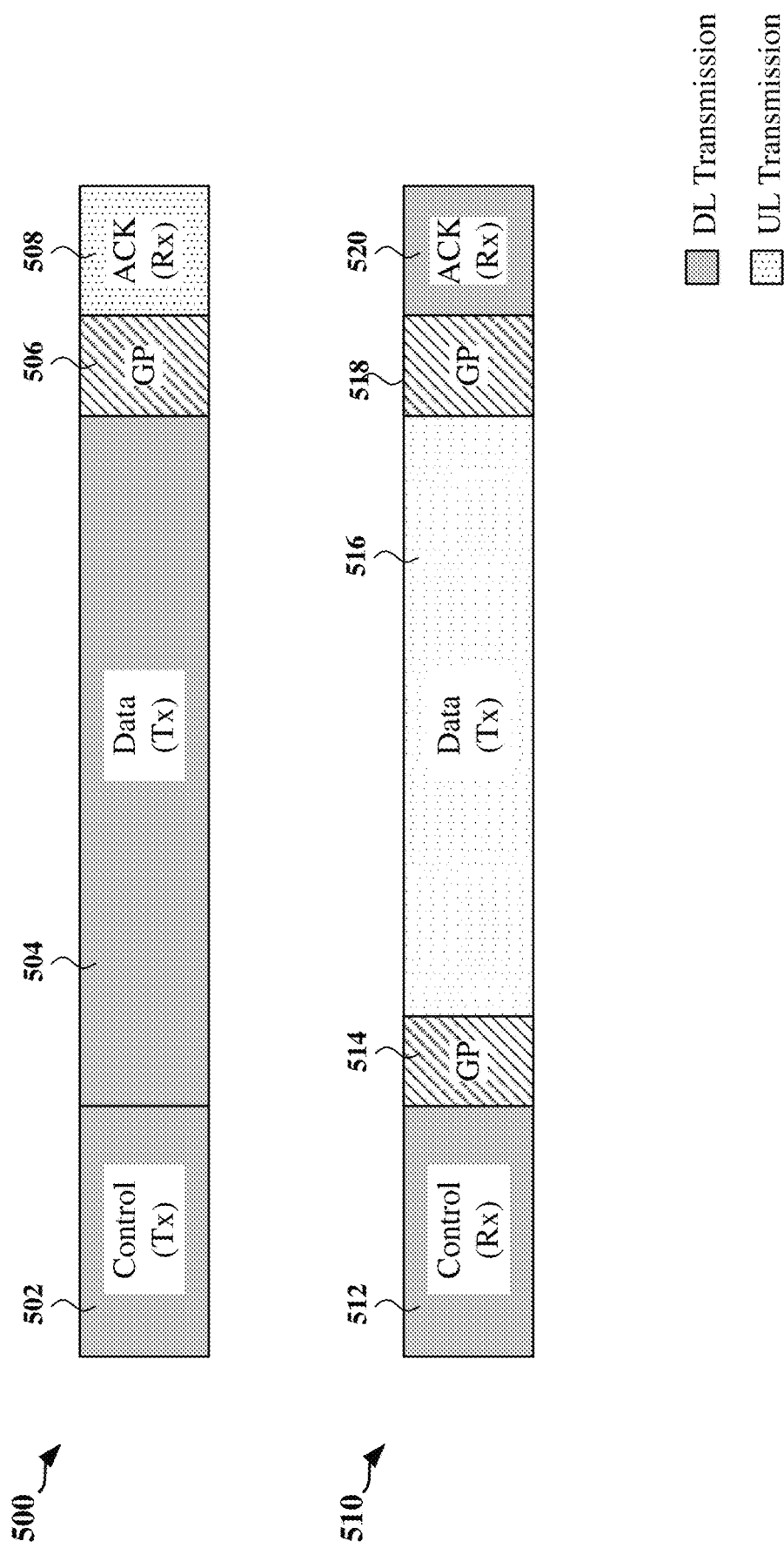
FIG. 5 illustrates the structure of uplink (UL)-centric and downlink (DL)-centric TDD subframes that may be used in some wireless communication networks.

FIG. 5 illustrates exemplary structures of TDD subframes 500 and 510. The TDD subframes 500 and 510 may have a fixed duration (t), but may also be configurable and determined during network deployment and/or may be updated through control messages or system messages. In one example, the duration of the TDD subframe 500 may be 500 µs. Of course, any suitable subframe duration may be utilized within the scope of the present disclosure.

A transmitter-scheduled subframe, referred to herein as a downlink TTI subframe or DL-centric subframe 500, may be used to carry downlink control and data information to one or more subordinate entities, which may be UEs for example, and also to receive acknowledgement information (e.g., ACK/NACK signals) from the subordinate entity or entities. Thus, each DL-centric subframe includes both DL transmissions and UL transmissions and is divided with respect to time (t) into DL transmission and UL transmission portions. A receiver-scheduled subframe, referred to herein as an uplink TTI subframe or UL-centric subframe 510, may be used to receive downlink control information from the scheduling entity, transmit uplink data to a scheduling entity, and receive a downlink ACK/NACK signal for the transmitted data from the scheduling entity. Thus, each UL-centric subframe 510 also includes both DL transmissions and UL transmissions and is divided with respect to time (t) into DL transmission and UL transmission portions.

In the example of the DL-centric subframe 500 shown in FIG. 5, the DL transmission portions include a control portion 502 and a data portion 504, and the UL transmission portions include an acknowledgement (ACK/NACK) portion 508. Therefore, within the subframe structure of FIG. 5, the scheduling entity first has an opportunity to transmit control/scheduling information in the control portion 502, and then an opportunity to transmit data in the DL data portion 504. Following a guard period (GP) portion 506, the scheduling entity has an opportunity to receive acknowledged (ACK)/not acknowledged (NACK) signals (ACK/NACK packets) from subordinate entities using the carrier. This frame structure is downlink-centric, as more resources are allocated for transmissions in the downlink direction (e.g., transmissions from the scheduling entity) than for transmissions in the uplink direction (e.g., transmissions from the subordinate entities).

In one example, the control information portion 502 may be used to transmit a physical downlink control channel (PDCCH) indicating time-frequency assignments of data packets intended for one or more subordinate entities in the current subframe 500 and/or subsequent subframe(s), and the DL data portion 504 may be used to transmit a data payload including the data packets intended for the one or more subordinate entities within the assigned time-frequency slots of the current subframe 500 and/or subsequent subframe(s). Thus, each subordinate entity that will be receiving data in the data portion 504 of the subframe 500 may be individually addressed in the control portion 502 of the current subframe 500 and/or previous subframe(s), so that the subordinate entities can receive and process the correct downlink data packets. Following the GP portion 506, the scheduling entity may receive an ACK signal (or a NACK signal) during the ACK/NACK portion 508 from each subordinate entity that received data packets during the data portion 504 of the current subframe and/or previous subframe(s) to indicate whether the data packets were successfully received.

In other examples, the control portion 502 may be used to transmit other downlink control channels and/or other downlink pilots, such as the channel state information-reference signal (CSI-RS). These additional downlink channels and/or pilots, along with any other downlink control information, may be transmitted together with the PDCCH within the control portion 502. Broadly, any suitable transmission in the DL direction may be made complementary to the control information described above within the control portion 502. In addition, the ACK/NACK portion 508 may also be used for transmission of other uplink control channels and information, such as the physical uplink control channel (PUCCH), random access channel (RACH), scheduling request (SR), sounding reference signal (SRS), channel quality indicator (CQI), channel state feedback information and buffer status. Broadly, any suitable transmission in the UL direction may be made complementary to the ACK/NACK and other information described above within the ACK/NACK portion 508.

In an aspect of the disclosure, the data portion 504 may be used to multiplex DL data transmissions to a set of subordinate entities (i.e., two or more subordinate entities) within the subframe 500. For example, the scheduling entity may multiplex downlink data to the set of subordinate entities using time division multiplexing (TDM), frequency division multiplexing (FDM) (i.e., OFDM), code division multiplexing (CDM), and/or any suitable multiplexing scheme known to those of ordinary skill in the art. Thus, the DL data portion 504 may include data for multiple users and up to a high order of multi-user MIMO. In addition, the control portion 502 and ACK/NACK portion 508 may also be used to multiplex control information to or from a set of subordinate entities in a TDM, FDM, CDM, and/or other suitable manner.

The GP portion 506 may be scheduled to accommodate variability in UL and DL timing. For example, latencies due to RF antenna direction switching (e.g., from DL to UL) and RF settling (e.g., settling of phase lock loops, filters and power amplifiers), along with transmission path latencies, may cause the subordinate entity to transmit early on the UL to match DL timing. Such early transmission may interfere with symbols received from the scheduling entity. Accordingly, the GP portion 506 may allow an amount of time after the DL data portion 504 to prevent interference, where the GP portion 506 may provide an appropriate amount of time for the scheduling entity to switch its RF antenna direction, for the over-the-air (OTA) transmission time, and time for ACK processing by the subordinate entity. The GP portion 506 may further provide an appropriate amount of time for the subordinate entity to switch its RF antenna direction (e.g., from DL to UL), to process the data payload, and for the over-the-air (OTA) transmission time.

The duration of the GP portion 506 may be configurable based on, for example, the cell size and/or processing time requirements. For example, the GP portion 506 may have a duration of one symbol period (e.g., 31.25 µs). However, in accordance with aspects of the disclosure, the switch point from DL to UL transmissions may be deterministic throughout the network. Thus, although the beginning point of the GP portion 506 may be variable and configurable, the ending point of the GP portion 506 corresponding to the switch point from DL transmissions to UL transmissions may be fixed by the network to manage interference between DL and UL transmissions. In an aspect of the disclosure, the switch point may be updated by the network in a semi-static manner and indicated in the PDCCH. In addition, the GP duration and/or beginning point of the GP portion 506 may also be indicated in the PDCCH.

In the example of the UL-centric subframe 510 shown in FIG. 5, the DL transmission portions include a control portion 512 and an acknowledgement portion 520, and the UL transmission portions include a data portion 516. Therefore, within the UL-centric subframe structure shown in FIG. 5, the subordinate entity first has an opportunity to receive control information in the control portion 512. Following a GP portion 514, the subordinate entity has an opportunity to transmit data in the UL data portion 516, and following another GP portion 518, to receive acknowledgement information (e.g., an ACK/NACK signal) in the ACK/NACK portion 520. This frame structure is uplink-centric, as more resources are allocated for transmissions in the uplink direction (e.g., transmissions from the subordinate entity) than in the downlink direction (e.g., transmissions from the scheduling entity).

In one example, the control information portion 512 may be used to transmit a physical downlink control channel (PDCCH) indicating time-frequency assignments of data packets to be transmitted by one or more subordinate entities in the current subframe 510 and/or subsequent subframe(s), and the data portion 516 may be used to by the subordinate entities to transmit their data packets to the scheduling entity within the assigned time-frequency slots in the current subframe 510 and/or subsequent subframe(s). Each subordinate entity that transmitted data within the data portion 516 may then receive an ACK signal (or a NACK signal) during the ACK/NACK portion 520 of the current subframe 510 and/or subsequent subframe(s) from the scheduling entity to indicate whether the data packets were successfully received at the scheduling entity.

In other examples, the control portion 512 and/or ACK/NACK portion 520 may be used to transmit other downlink control channels and information and/or data from other layers. In addition, the data portion 516 may also be used to transmit uplink control channels and information. For example, the control portion 512 of a subframe 510 may carry a data transmission (e.g., a small payload of data) for a subordinate entity, such as an application layer (or layer other than the physical layer) ACK from a previous subframe. The subordinate entity may then acknowledge the data transmission in the data portion 516 of the same subframe 510 and/or subsequent subframe(s).

In an aspect of the disclosure, the UL data portion 516 may be used to carry data transmissions from a set of subordinate entities (i.e., two or more subordinate entities) within the subframe 510 using one or more of TDMA, FDMA, CDMA, or any other suitable multiple access scheme. Thus, the UL data portion 516 may include packets from multiple users and up to a high order of multi-user MIMO. In addition, the control portion 512 and ACK/NACK portion 520 may also be used to carry control information to a set of subordinate entities in a TDMA, FDMA, CDMA, or other suitable multiple access manner. In an aspect of the disclosure, UL data processing at the scheduling entity may be amortized over the entire TTI. For example, the control portion 512, the ACK/NACK portion 520, and part of the GP portion 514 may all be used to decode UL data in the data portion 516.

Figure 6:
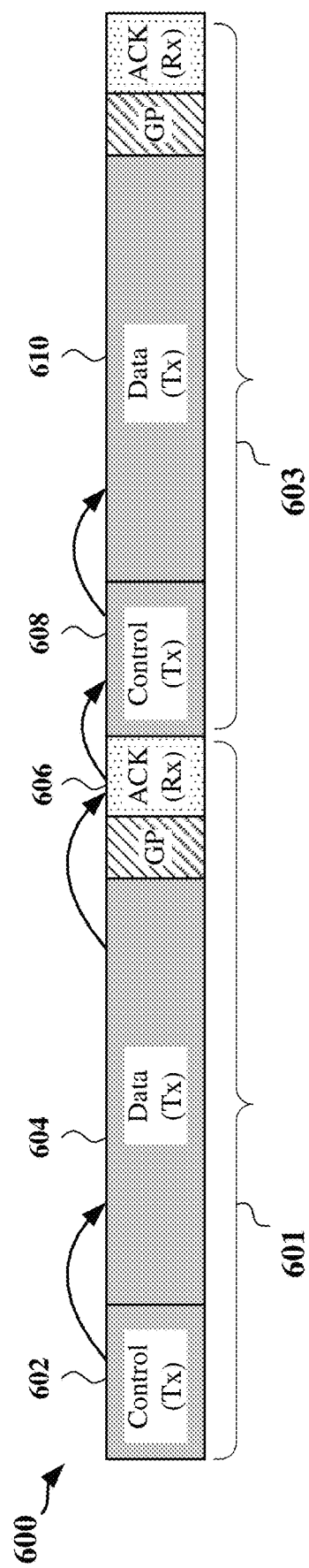
FIG. 6 is a diagram illustrating a DL-centric TDD subframe structure implementing a single interlace mode.

FIG. 6 is a diagram illustrating a DL-centric TDD subframe structure 600 implementing a single interlace mode. In the single interlace mode, downlink (DL)-centric subframes 601 and 603 are each self-contained, such that control information, data information corresponding to the control information and ACK information corresponding to the data information are all included within a single DL-centric subframe 601 or 603. For example, control information may be transmitted by the scheduling entity in a control information portion 602 of a first DL-centric subframe 601, data information corresponding to the control information (as indicated by the arrow pointing from the control portion 602 to a data portion 604) may be transmitted by the scheduling entity in the data portion 604 of the first DL-centric subframe 601, and acknowledgement information corresponding to the data information (as indicated by the arrow pointing from the data portion 604 to an ACK/NACK portion 606) may be received by the scheduling entity from subordinate entities in the ACK/NACK portion 606 of the first DL-centric subframe 601.

Based on the ACK/NACK information received in the ACK/NACK portion 606 of the first DL-centric subframe 601, the scheduling entity generates control information for a control portion 608 of a next (second) DL-centric subframe 603 (as indicated by the arrow pointing from the ACK/NACK portion 606 to the control portion 608). For example, if the ACK/NACK information includes a NACK signal, at least part of the coded bits of the data information transmitted in the data portion 604 of the first DL-centric subframe 601 may be retransmitted in a data portion 610 of the second DL-centric subframe 603.

Figure 7:
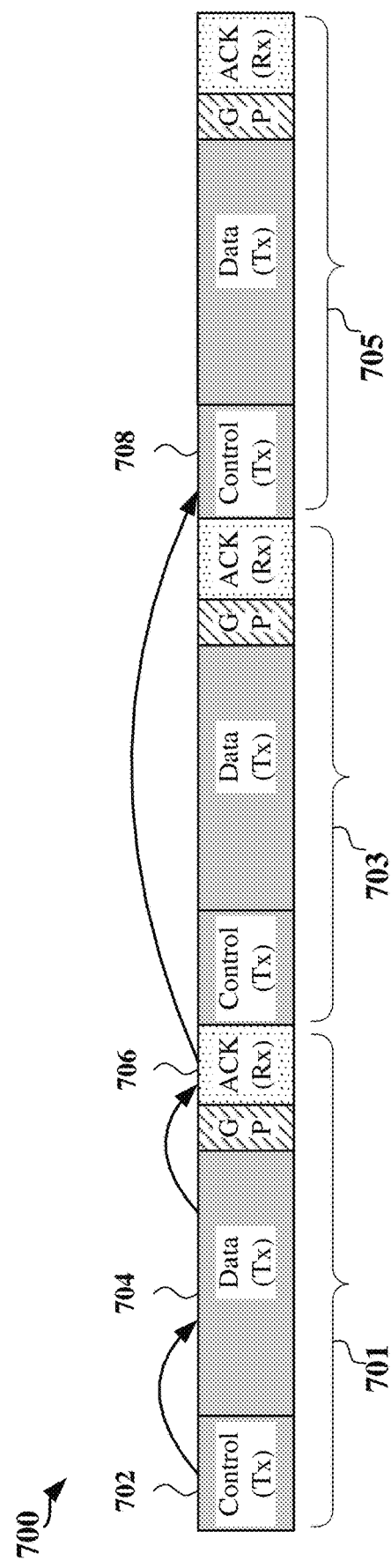
FIG. 7 is a diagram illustrating an example of a DL-centric TDD subframe structure implementing a multiple interlace mode.

FIG. 7 is a diagram illustrating a DL-centric TDD subframe structure 700 implementing a multiple interlace mode that provides additional processing time in the scheduling entity by delaying HARQ retransmission for one or more subframes. In FIG. 7, each DL-centric TDD subframe 701, 703, and 705 may be self-contained. However, retransmissions are not scheduled in back-to-back subframes. Instead, retransmissions may be scheduled in subsequent subframes (e.g., every other subframe or any other delayed scheduling configuration).

For example, the first DL-centric subframe 701 may be self-contained such that control information in a control information portion 702, data information corresponding to the control information (as indicated by the arrow pointing from the control portion 702 to a data portion 704) and acknowledgement information corresponding to the data information (as indicated by the arrow pointing from the data portion 704 to an ACK/NACK portion 706) may be included in the first DL-centric subframe 701. However, to allow for additional ACK/NACK processing time in the scheduling entity, instead of scheduling HARQ retransmissions in the next DL-centric subframe 703, the scheduling entity can delay retransmission until DL-centric subframe 705 for one or more subordinate entities. For example, based on the ACK/NACK information received from one or more subordinate entities in the ACK/NACK portion 706 of the first DL-centric subframe 701, the scheduling entity may schedule the next transmission for those one or more subordinate entities in DL-centric subframe 705 (as indicated by the arrow pointing from the ACK/NACK portion 706 to the control portion 708 of DL-centric subframe 705).

In an aspect of the disclosure, the scheduling entity may multiplex both single interlace subordinate entities and multiple interlace subordinate entities within TDD subframes 701, 703, and 705. For example, the scheduling entity may schedule high throughput subordinate entities in the single interlace mode and low throughput subordinate entities in the multiple interlace mode. The high throughput subordinate entities may be scheduled, for example, in DL-centric frames 701, 703, and 705, while low throughput subordinate entities may be scheduled in DL-centric frames 701 and 705. In an additional aspect, for one or more of the single interlace subordinate entities, the scheduling entity may utilize pre-generated waveforms for HARQ retransmission and/or new transmissions to ensure the scheduling entity meets the scheduling timeline requirements for the single interlace mode subordinate entities.

Figure 8:
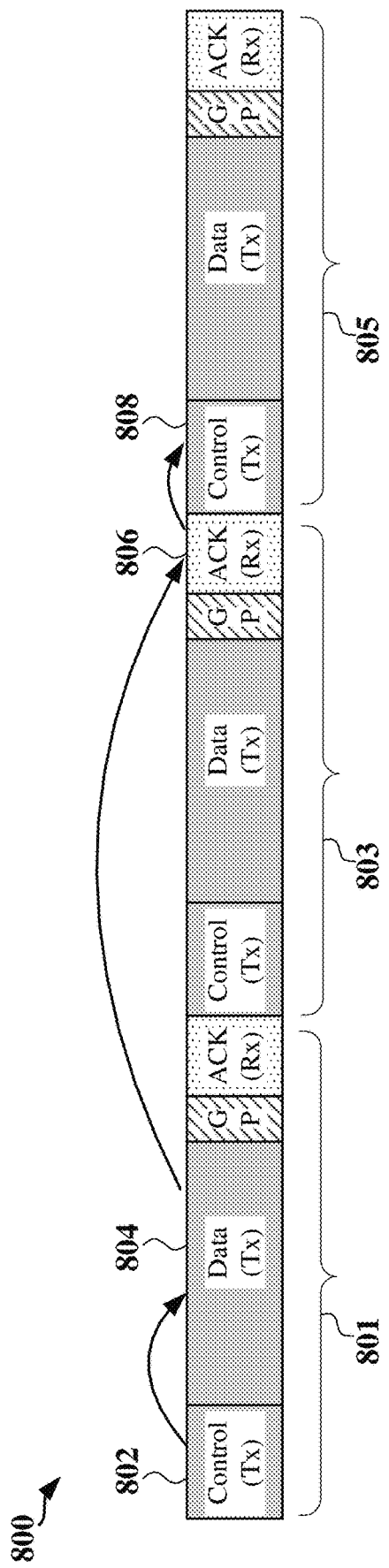
FIG. 8 is a diagram illustrating an example of a DL-centric TDD subframe structure implementing a multiple interlace mode.

FIG. 8 is a diagram illustrating a TDD subframe structure 800 implementing a multiple interlace mode that provides additional processing time in the subordinate entity by delaying ACK/NACK information for one or more subframes. In FIG. 8, although the DL-centric TDD subframe structure remains the same, each DL-centric subframe 801, 803, and 805 may not be self-contained. Instead, the ACK/NACK portion in a particular subframe may correspond to data transmitted in a previous subframe.

For example, in the first DL-centric subframe 801, data information in a data portion 804 corresponds to control information in a control portion 802 (as indicated by the arrow pointing from the control portion 802 to a data portion 804). However, to allow for additional data processing time in one or more subordinate entities, instead of scheduling ACK/NACK signals for those one or more subordinate entities in the first DL-centric subframe 801, the scheduling entity can schedule ACK/NACK signals in the next DL-centric subframe 803 or in any other subsequent DL-centric subframe. In the example shown in FIG. 8, the ACK/NACK signals from those one or more subordinate entities can be received by the scheduling entity in the acknowledgement portion 806 of the second DL-centric subframe 803. Then, based on the ACK/NACK information received in the ACK/NACK portion 806 of the second DL-centric subframe 803, the scheduling entity may schedule the next transmission for those one or more subordinate entities in DL-centric subframe 805 (as indicated by the arrow pointing from the ACK/NACK portion 806 to the control portion 808 of DL-centric subframe 805) or in any other subsequent DL-centric subframe.

In an aspect of the disclosure, the scheduling entity may multiplex both single interlace subordinate entities and multiple interlace subordinate entities within TDD subframes 801, 803, and 805. For example, the scheduling entity may schedule high throughput subordinate entities in the single interlace mode and low throughput subordinate entities in the multiple interlace mode. The high throughput subordinate entities may be scheduled to transmit ACK/NACK in TDD subframes 801, 803, and 805, while low throughput subordinate entities may be scheduled to transmit ACK/NACK in TDD subframe 803. In an additional aspect, the scheduling entity may multiplex single interlace, ACK-delayed multiple interlace and control-delayed multiple interlace subordinate entities within TDD subframes 801, 803, and 805. The scheduling entity may further delay both the control and ACK for one or more subordinate entities and multiplex such control/ACK-delayed multiple interlace subordinate entities with single interlace subordinate entities and other types of multiple interlace subordinate entities (ACK-delayed and/or control-delayed).

Figure 9:
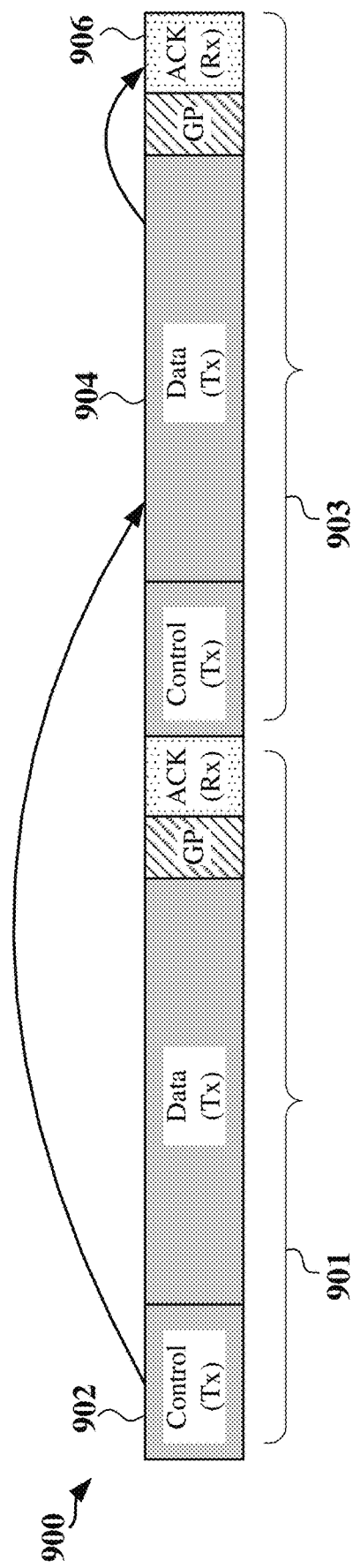
FIG. 9 is a diagram illustrating an example of a DL-centric TDD subframe structure implementing a multiple interlace mode.

FIG. 9 is a diagram illustrating a DL-centric TDD subframe structure 900 implementing a multiple interlace mode in which the control information is prescheduled. In FIG. 9, although the DL-centric TDD subframe structure remains the same, each DL-centric subframe 901 and 903 may not be self-contained. Instead, the control portion of a particular subframe may correspond to data transmitted in a subsequent subframe.

For example, control information in a control portion 902 of a first DL-centric subframe 901 may correspond to data information in a data portion 904 of a second DL-centric subframe 903 (as indicated by the arrow pointing from the control portion 902 to the data portion 904). The acknowledgement information corresponding to the data information may be included in the acknowledgement portion 906 of the second DL-centric subframe 903 (as indicated by the arrow pointing from the data portion 904 to the acknowledgement portion 906) or may be included in a subsequent subframe to extend the processing time of the subordinate entity. In addition, although not shown, retransmissions and/or new transmissions may be scheduled in a next DL-centric subframe after the second DL-centric subframe 903 or in any subsequent DL-centric subframe to extend the processing time of the scheduling entity.

In an aspect of the disclosure, prescheduling the control information may support efficient micro-sleep and dynamic bandwidth switching by providing a delay between the control information and the data information. This delay enables the subordinate entity to wake up and open a larger bandwidth receiver before receipt of the data. The subordinate entity may monitor the control channel and enter into a micro-sleep state when no control grant is detected.

Figure 10:
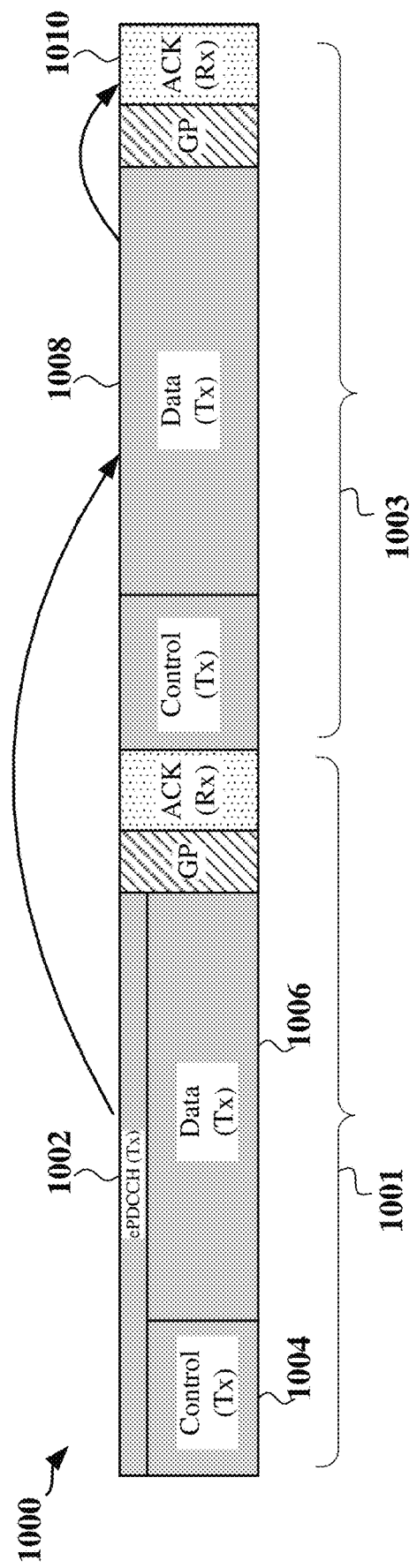
FIG. 10 is a diagram illustrating an example of a DL-centric TDD subframe structure implementing a multiple interlace mode.

FIG. 10 is a diagram illustrating a DL-centric TDD subframe structure 1000 implementing a control-prescheduled multiple interlace mode that supports an enhanced physical downlink control channel (ePDCCH) 1002. With an ePDCCH, control information may be spread out, e.g., over the entire subframe to boost the downlink control channel link budget. For example, control information corresponding to an ePDCCH 1002 may overlap, in time, both a control portion 1004 and a data portion 1006 of a first DL-centric subframe 1001. In one example, as illustrated in FIG. 10, the control information in the ePDCCH 1002 may be multiplexed with the control and data portions 1004 and 1006, respectively, using Frequency Division Multiplexing (FDM) relative to the control and data portions. In other examples, the control information in the ePDCCH 1002 may be multiplexed with the control and data portions 1004 and 1006 by a scrambling code using Code Division Multiplexing (CDM); or the control information in the ePDCCH 1002 may be multiplexed with the control and data portions 1004 and 1006, respectively, using Time Division Multiplexing (TDM).

Data information corresponding to the control information may then be included in a data portion 1008 of a next (second) DL-centric subframe 1003 (as indicated by the arrow pointing from the control portions 1004/1006 to the data portion 1008). The acknowledgement information corresponding to the data information may be included in the acknowledgement portion 1010 of the second DL-centric subframe 1003 (as indicated by the arrow pointing from the data portion 1006 to the acknowledgement portion 1008) or may be included in a subsequent subframe to extend the processing time of the subordinate entity. In addition, although not shown, retransmissions and/or new transmissions may be scheduled in a next DL-centric subframe after the second DL-centric subframe 1003 or in any subsequent DL-centric subframe to extend the processing time of the scheduling entity.

In an aspect of the disclosure, the scheduling entity may multiplex control-prescheduled multiple interlace subordinate entities with single interlace subordinate entities and other types of multiple interlace subordinate entities within the same TDD subframe structure. For example, the scheduling entity may schedule high throughput subordinate entities in the single interlace mode and low throughput subordinate entities in the control-prescheduled and/or control/ACK-delayed multiple interlace mode.

Figure 11:
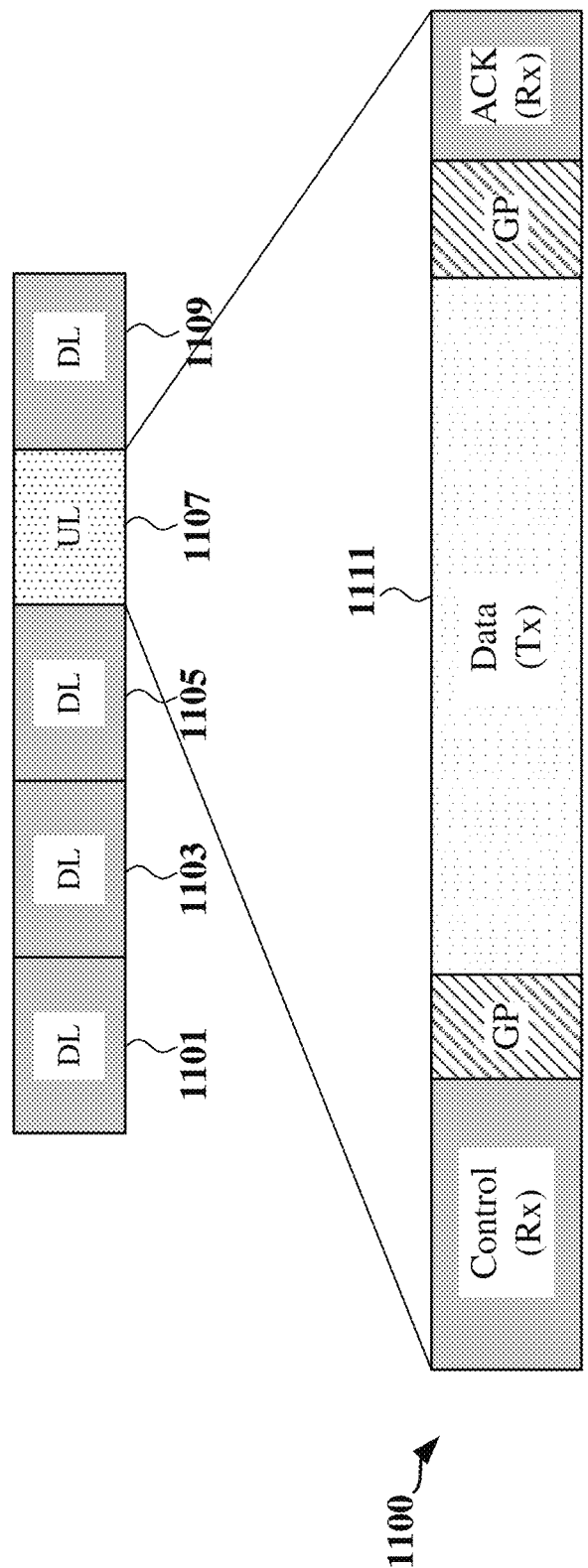
FIG. 11 is a diagram illustrating an example of UL-centric and DL-centric TDD subframes implementing a multiple interlace mode.

FIG. 11 is a diagram illustrating an UL-centric TDD subframe structure 1100 implementing a multiple interlaced mode in which the UL ACK is channelized in an UL-centric subframe 1107. For example, the ACKs from one or more DL-centric subframes 1101, 1103, and 1105 may be grouped together and transmitted within a data portion 1111 of an UL-centric subframe 1107. In an aspect of the disclosure, channelizing the ACKs in some of the UL-centric subframes 1107 may boost the ACK link budget by enabling an increase in the duration and/or number of ACK symbols. In other aspects, the ACKs may be bundled over multiple DL-centric/UL-centric subframes. For example, systematic ACKs may be sent in each DL-centric subframe, and parity ACKs (e.g., redundancy versions of the systematic ACKs) may be sent in some DL-centric subframes and/or UL-centric subframes to further improve the efficiency of the ACKs. Coding may also be used across these ACKs to improve the reliability of the ACKs.

Similarly, DL ACKs from one or more UL-centric subframes may be grouped together and transmitted within the control, data, and/or ACK portion of a DL-centric subframe.

For example, the DL ACK from UL-centric subframe 1107 may be transmitted within the control, data, and/or ACK portion of DL-centric subframe 1109.

In addition to acknowledgement information, data and/or scheduling information may also be transmitted between UL-centric and DL-centric subframes. In one example, a DL data retransmission corresponding to a NACK in the ACK portion of a DL-centric subframe may be included within an UL-centric subframe. Similarly, an UL data retransmission corresponding to a NACK in the ACK portion of an UL-centric subframe may be included within a DL-centric subframe. In another example, scheduling information for data to be transmitted within a DL-centric subframe may be included within a prior UL-centric subframe (and vice-versa).

Figure 12:
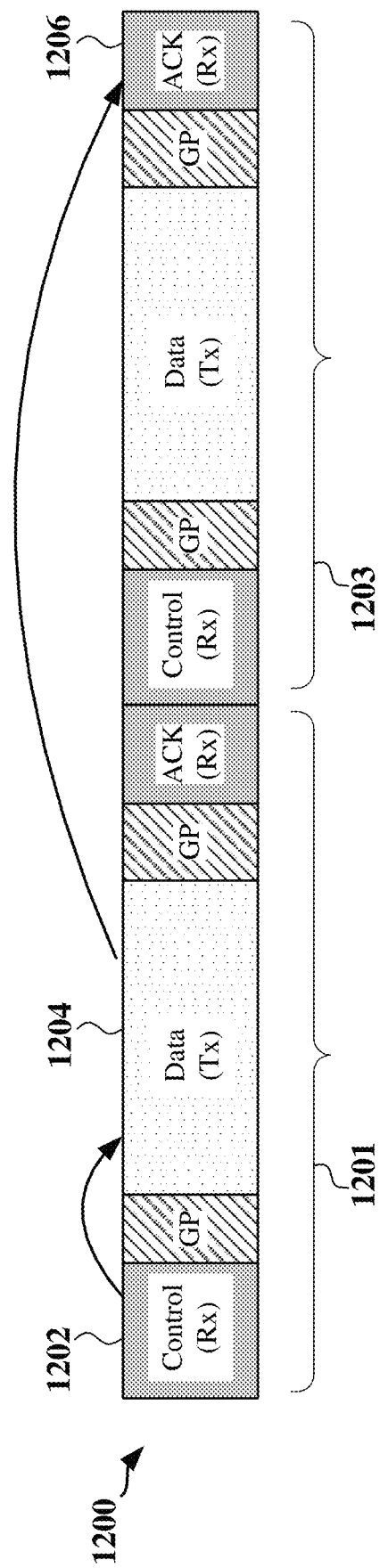
FIG. 12 is a diagram illustrating an example of an UL-centric TDD subframe structure implementing a multiple interlace mode.

FIG. 12 is a diagram illustrating an UL-centric TDD subframe structure 1200 implementing a multiple interlace mode that provides additional processing time in the scheduling entity by delaying DL ACK/NACK one or more subframes. In FIG. 12, although the UL-centric TDD subframe structure remains the same, each UL-centric TDD subframe 1201 and 1203 may not be self-contained. Instead, the DL ACK/NACK portion in a particular UL-centric subframe may correspond to data transmitted in a previous UL-centric subframe.

For example, in the first UL-centric subframe 1201, data information transmitted by subordinate entities in a data portion 1204 corresponds to control information transmitted by the scheduling entity in a control portion 1202 (as indicated by the arrow pointing from the control portion 1202 to a data portion 1204). However, to allow for additional data processing time by the scheduling entity, instead of scheduling DL ACK/NACK signals transmitted by the scheduling entity in the first subframe 1201, the scheduling entity can schedule ACK/NACK signals in the next UL-centric subframe 1203. Thus, the ACK/NACK signals can be sent to the subordinate entities in the acknowledgement portion 1206 of the second UL-centric subframe 1203 (as indicated by the arrow pointing from the data portion 1204 to the acknowledgement portion 1206).

Figure 13:
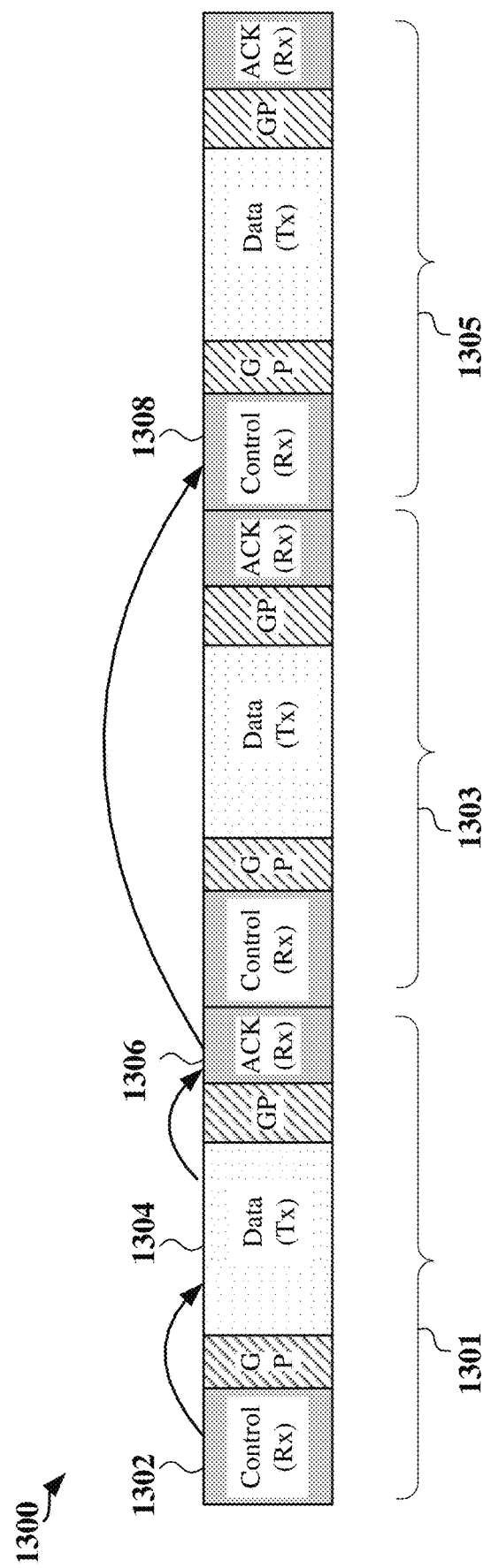
FIG. 13 is a diagram illustrating an example of an UL-centric TDD subframe structure implementing a multiple interlace mode.

FIG. 13 is a diagram illustrating an UL-centric TDD subframe structure 1300 implementing a multiple interlace mode that provides additional processing time in the subordinate entities and relaxed scheduling in the scheduling entity by delaying UL retransmissions one or more subframes. In FIG. 13, although the UL-centric TDD subframe structure remains the same, each UL-centric TDD subframe 1301, 1303, and 1305 may not be self-contained. Instead, UL retransmissions may be scheduled in subsequent UL-centric subframes (e.g., every other UL-centric subframe or any other delayed scheduling configuration).

For example, in the first UL-centric subframe 1301, data information transmitted by subordinate entities in a data portion 1304 corresponds to control information transmitted by the scheduling entity in a control portion 1302 (as indicated by the arrow pointing from the control portion 1302 to a data portion 1304). In addition, acknowledgement information transmitted by the scheduling entity and corresponding to the data information may be included in the acknowledgement (ACK/NACK) portion 1306 of the first UL-centric subframe 1301 (as indicated by the arrow pointing from the data portion 1304 to the ACK/NACK portion 1306). However, to allow for additional ACK/NACK processing time in the subordinate entities, instead of scheduling HARQ retransmissions in the next TDD subframe 1303, the scheduling entity can delay retransmission until UL-centric TDD subframe 1305 for one or more subordinate entities (as indicated by the arrow pointing from the ACK/NACK portion 1306 to the control portion 1308 of UL-centric subframe 1305).

In an aspect of the disclosure, the scheduling entity may multiplex both single interlace subordinate entities and multiple interlace subordinate entities within UL-centric TDD subframes. For example, the scheduling entity may schedule high throughput subordinate entities in the single interlace mode and low throughput subordinate entities in the multiple interlace mode. The high throughput subordinate entities may be scheduled to transmit data in UL-centric subframes 1301, 1303, and 1305, while low throughput subordinate entities may be scheduled to transmit data in UL-centric subframes 1301 and 1303. In an additional aspect, the scheduling entity may multiplex single interlace, ACK-delayed multiple interlace and control-delayed multiple interlace subordinate entities within UL-centric subframes 1301, 1303, and 1305. The scheduling entity may further delay both the DL control and DL ACK for one or more subordinate entities and multiplex such control/ACK-delayed multiple interlace subordinate entities with single interlace subordinate entities and other types of multiple interlace subordinate entities (ACK-delayed and/or control-delayed).

Figure 14:
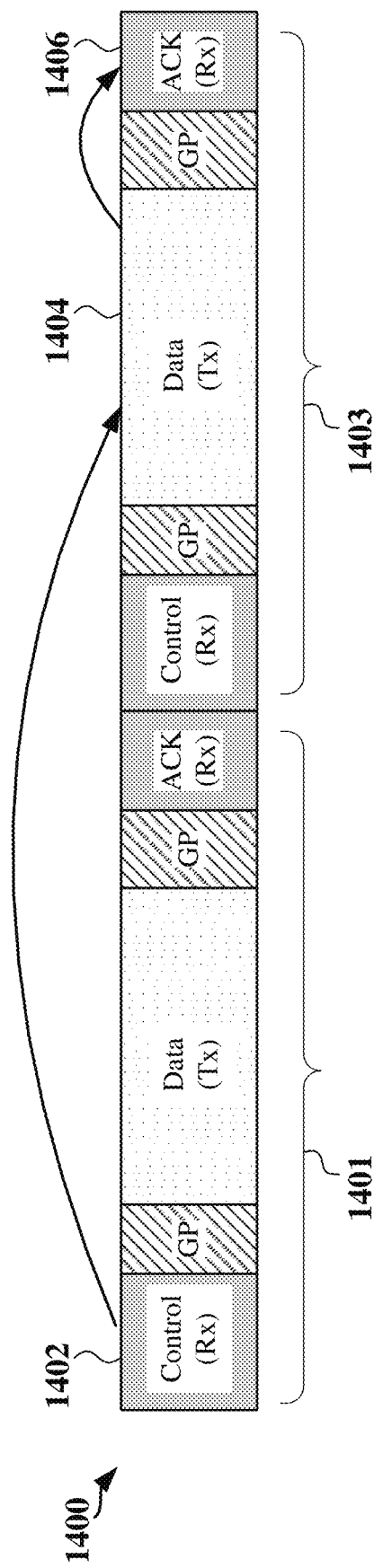
FIG. 14 is a diagram illustrating an example of an UL-centric TDD subframe structure implementing a multiple interlace mode.

FIG. 14 is a diagram illustrating an UL-centric TDD subframe structure 1400 implementing a multiple interlace mode in which the control information is prescheduled to relax the control/data processing timeline in the subordinate entities. In FIG. 14, although the UL-centric TDD subframe structure remains the same, each UL-centric TDD subframe 1401 and 1403 may not be self-contained. Instead, the control portion of a particular UL-centric subframe may correspond to data transmitted by one or more subordinate entities in a subsequent UL-centric subframe.

For example, control information transmitted by a scheduling entity in a control portion 1402 of a first UL-centric subframe 1401 may correspond to data information transmitted by one or more subordinate entities in a data portion 1404 of a second UL-centric subframe 1403 (as indicated by the arrow pointing from the control portion 1402 to the data portion 1404). The acknowledgement information transmitted by the scheduling entity and corresponding to the data information may be included in the acknowledgement portion 1406 of the second DL-centric subframe 1403 or may be included in a subsequent UL-centric subframe to extend the processing time of the scheduling entity. In addition, although not shown, retransmissions and/or new transmissions by subordinate entities may be scheduled in a next UL-centric subframe after the second DL-centric subframe 1403 or in a subsequent UL-centric subframe to extend the processing time of the scheduling entity.

Figure 15:
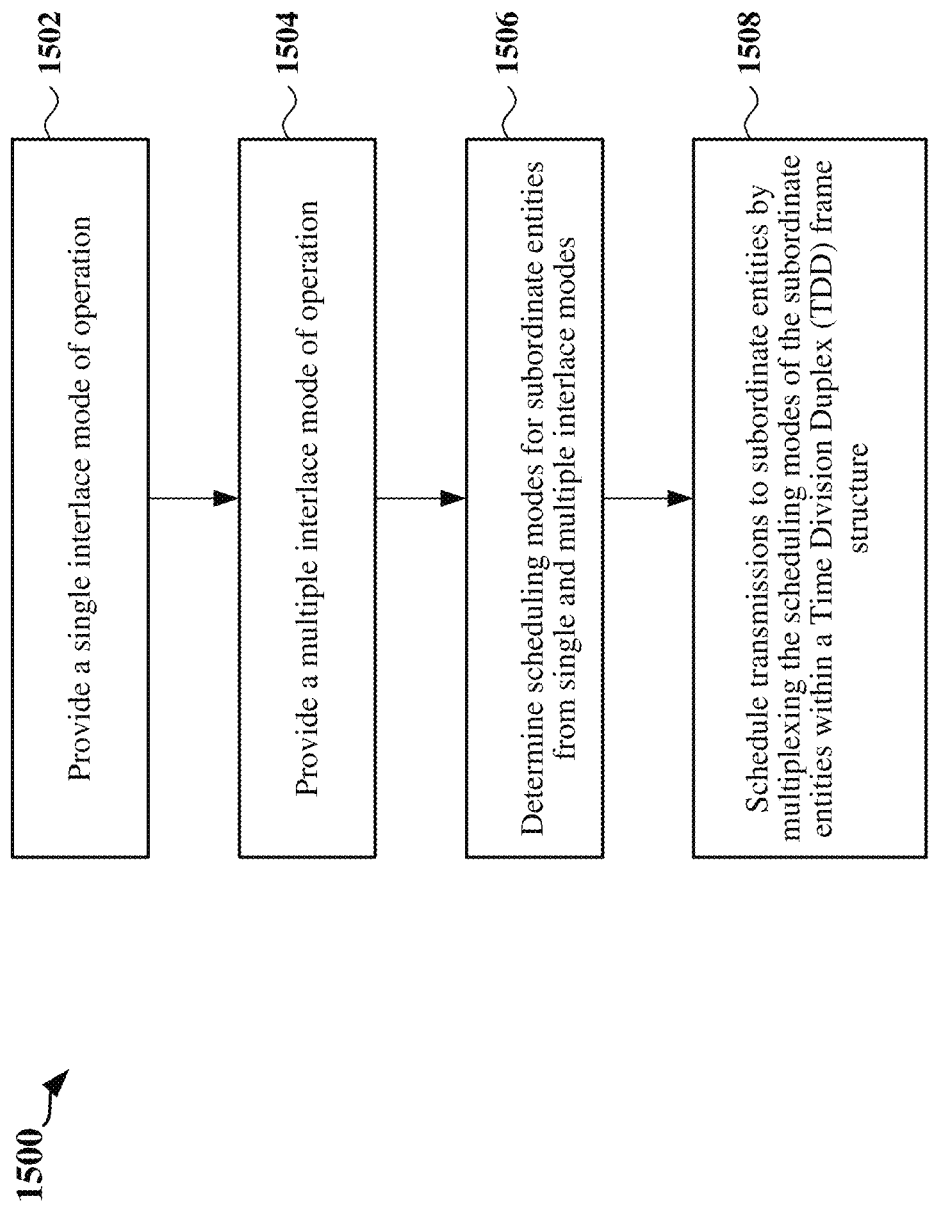
FIG. 15 is a flow chart of a method of wireless communication utilizing a TDD subframe structure.

FIG. 15 is a flow chart 1500 of a method of wireless communication utilizing a TDD subframe structure. The method may be performed by a scheduling entity as described above and illustrated in FIGS. 2 and 3, by a processor or processing system, or by any suitable means for carrying out the described functions.

At block 1502, the scheduling entity provides a single interlace mode of operation. For example, with reference to FIGS. 5 and 6, the single interlace mode of operation may include a self-contained UL-centric and/or DL-centric TDD subframe structure in which the control information, data information corresponding to the control information, and acknowledgement information corresponding to the data information are transmitted within a single TDD subframe.

At block 1504, the scheduling entity provides a multiple interlace mode of operation. In various aspects, with reference to FIGS. 7-14, the multiple interlace mode of operation may include the same basic UL-centric and/or DL-centric TDD subframe structure as the single interlace mode, but with one or more of the control, data, or acknowledgement information transmitted in a separate UL-centric or DL-centric TDD subframe.

At block 1506, the scheduling entity determines a respective scheduling mode for each subordinate entity from the single interlace and multiple interlace modes. In an aspect of the disclosure, the scheduling entity considers one or more factors when assigning a particular scheduling mode to a subordinate entity. Examples of factors may include, but are not limited to, throughput requirements, HARQ buffer requirements, latency requirements, processing speed of both the subordinate and scheduling entities, power consumption requirements of both the subordinate and scheduling entities, whether the subordinate entity has entered a micro-sleep mode, and the link budget of the uplink and downlink. The scheduling mode may be statically determined or dynamically updated periodically, based upon scheduling requirements of the scheduling entity, or upon request from the subordinate entity.

At block 1508, the scheduling entity schedules transmissions to the subordinate entities by multiplexing the scheduling modes assigned to the subordinate entities within a TDD subframe structure. For example, single interlace subordinate entities may be scheduled to transmit ACK/NACK signals in each DL-centric TDD subframe or data in each UL-centric TDD subframe, while each interlace of multiple interlace subordinate entities may be scheduled to transmit ACK/NACK signals in alternating DL-centric TDD subframes or data in alternating UL-centric subframes (with multiple interlaces alternating between adjacent subframes).

Figure 16:
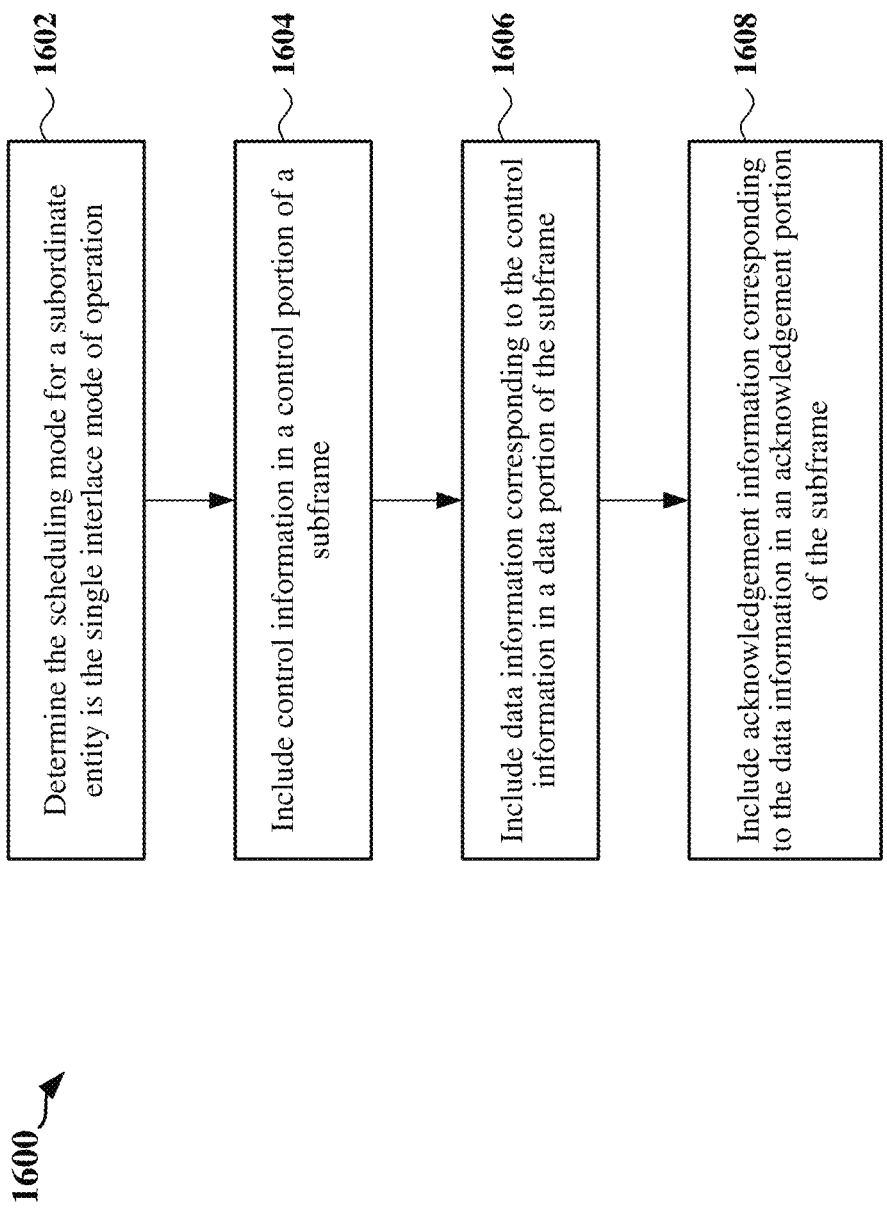
FIG. 16 is a flow chart of a method of wireless communication utilizing a TDD subframe structure in a single interlace mode of operation.

FIG. 16 is a flow chart 1600 of a method of wireless communication utilizing a TDD subframe structure in a single interlace mode of operation. The method may be performed by a scheduling entity as described above and illustrated in FIGS. 2 and 3, by a processor or processing system, or by any suitable means for carrying out the described functions.

At block 1602, the scheduling entity determines the scheduling mode for a subordinate entity is a single interlace mode of operation. In the single interlace mode of operation, a self-contained TDD subframe structure is utilized to generate a self-contained subframe. For example, with reference to FIGS. 5 and 6, the self-contained subframe structure may be a DL-centric subframe or an UL-centric subframe, in which the control information, data information corresponding to the control information and acknowledgement information corresponded to the data information are included within a single TDD subframe.

At block 1604, the scheduling entity generates a subframe having the self-contained subframe structure and includes control information in the control portion of the subframe. For a DL-centric subframe, the control information may include a PDCCH indicating the time-frequency resource assignments for data transmissions from the scheduling entity to the subordinate entity. For an UL-centric subframe, the control information may include a PDCCH indicating the time-frequency resource assignments for data transmissions from the subordinate entity to the scheduling entity. In addition, other downlink control information may also be included within the control portion.

At block 1606, data information corresponding to the control information is included in the data portion of the subframe. For example, in a DL-centric subframe, the data information may include data packets transmitted to the subordinate entity on a downlink data channel. In an UL-centric subframe, the data information may include data packets transmitted from the subordinate entity on an uplink data channel.

At block 1608, acknowledgement information corresponding to the data information is included in the acknowledgement portion of the subframe. For example, in a DL-centric subframe, an ACK/NACK message from the subordinate entity that received data in the data portion of the subframe may be included in the acknowledgement portion of the subframe to indicate whether the subordinate entity correctly received the downlink data. In an UL-centric subframe, the acknowledgement information may include an ACK/NACK message to the subordinate entity that transmitted data in the data portion of the subframe to indicate whether the scheduling entity correctly received the uplink data.

Figure 17:
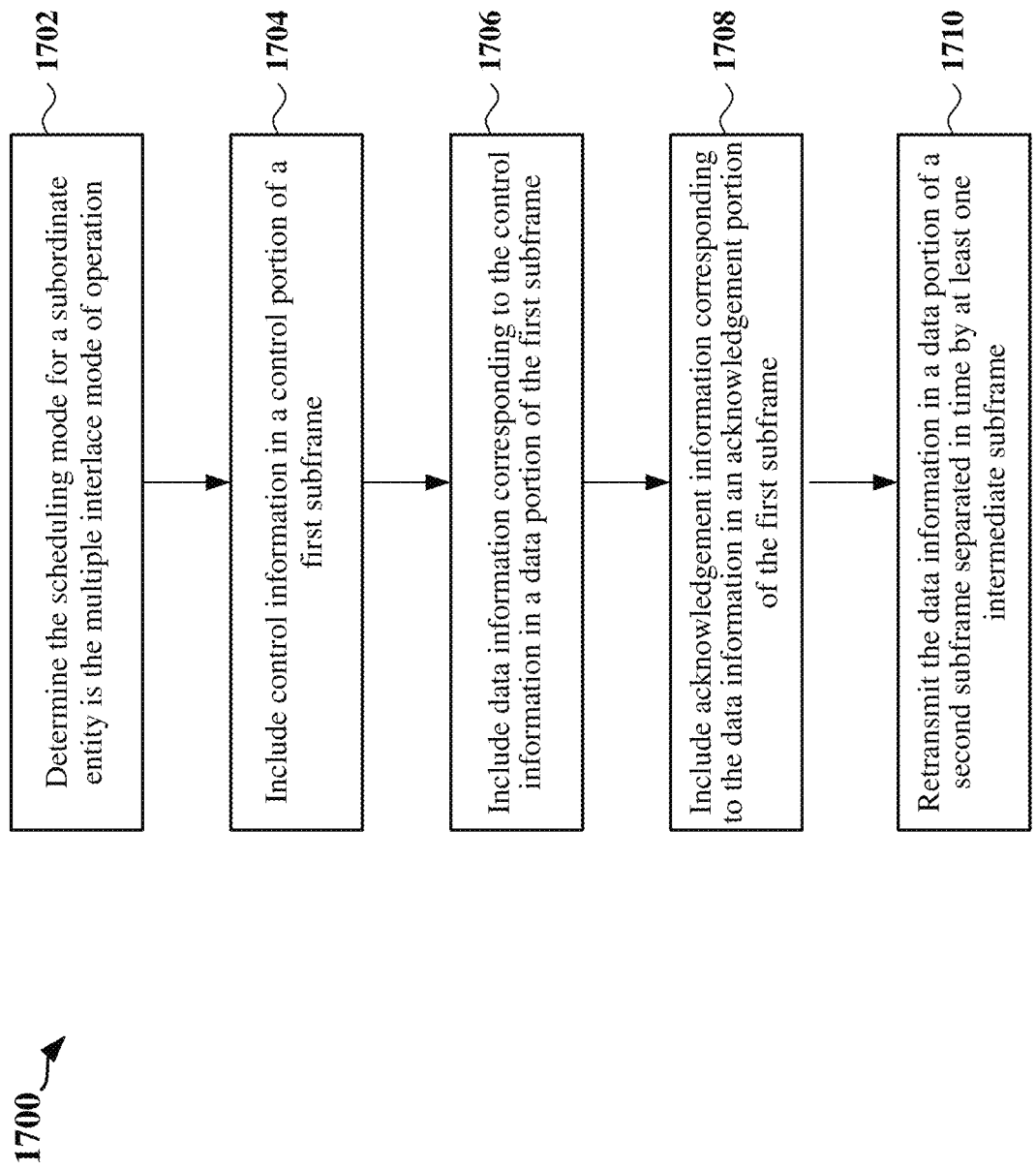
FIG. 17 is a flow chart of a method of wireless communication utilizing a TDD subframe structure in a multiple interlace mode of operation.

FIG. 17 is a flow chart 1700 of a method of wireless communication utilizing a TDD subframe structure in a multiple interlace mode of operation. The method may be performed by a scheduling entity as described above and illustrated in FIGS. 2 and 3, by a processor or processing system, or by any suitable means for carrying out the described functions.

At block 1702, the scheduling entity determines the scheduling mode for a subordinate entity is a multiple interlace mode of operation. In the multiple interlace mode of operation, two or more TDD subframes are utilized to transmit the control, data (or retransmitted data) and acknowledgement information. Although the subframe structure in the multiple interlace mode of operation may be the same as that in the single interlace mode of operation, the subframe structure may not be entirely self-contained.

At block 1704, the scheduling entity generates a first subframe and includes control information in the control portion of the first subframe. For a DL-centric subframe, the control information may include a PDCCH indicating the time-frequency resource assignments for data transmissions from the scheduling entity to the subordinate entity. For an UL-centric subframe, the control information may include a PDCCH indicating the time-frequency resource assignments for data transmissions from the subordinate entity to the scheduling entity. In addition, other downlink control information may also be included within the control portion.

At block 1706, data information corresponding to the control information is included in the data portion of the first subframe. For example, in a DL-centric subframe, the data information may include data packets transmitted to the subordinate entity on a downlink data channel. In an UL-centric subframe, the data information may include data packets transmitted from the subordinate entity on an uplink data channel.

At block 1708, acknowledgement information corresponding to the data information is included in the acknowledgement portion of the subframe. For example, in a DL-centric subframe, an ACK/NACK message from the subordinate entity that received data in the data portion of the subframe may be included in the acknowledgement portion of the subframe to indicate whether the subordinate entity correctly received the downlink data. In an UL-centric subframe, the acknowledgement information may include an ACK/NACK message to the subordinate entity that transmitted data in the data portion of the subframe to indicate whether the scheduling entity correctly received the uplink data.

At block 1710, when a NACK is included in the acknowledgement information, the scheduling entity generates a second subframe subsequent to the first subframe and retransmits the data from the first subframe in a data portion of the second subframe. As shown in FIGS. 7 and 13, the second subframe may be separated in time from the first subframe by at least one intermediate subframe.

Figure 18:
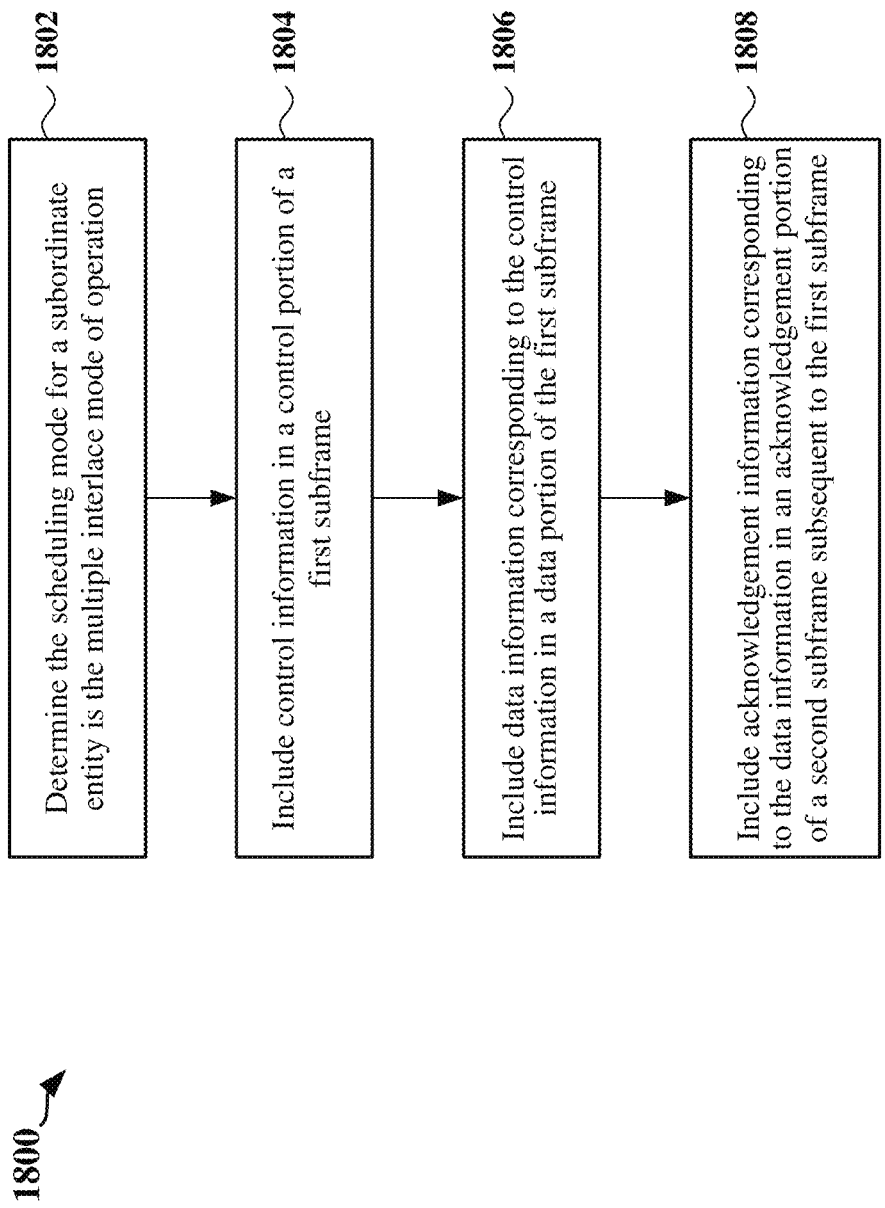
FIG. 18 is a flow chart of a method of wireless communication utilizing a TDD subframe structure in a multiple interlace mode of operation.

FIG. 18 is a flow chart 1800 of a method of wireless communication utilizing a TDD subframe structure in a multiple interlace mode of operation. The method may be performed by a scheduling entity as described above and illustrated in FIGS. 2 and 3, by a processor or processing system, or by any suitable means for carrying out the described functions.

At block 1802, the scheduling entity determines the scheduling mode for a subordinate entity is a multiple interlace mode of operation. In the multiple interlace mode of operation, two or more TDD subframes are utilized to transmit the control, data (or retransmitted data) and acknowledgement information. Although the subframe structure in the multiple interlace mode of operation may be the same as that in the single interlace mode of operation, the subframe structure may not be entirely self-contained.

At block 1804, the scheduling entity generates a first subframe and includes control information in the control portion of the first subframe. For a DL-centric subframe, the control information may include a PDCCH indicating the time-frequency resource assignments for data transmissions from the scheduling entity to the subordinate entity. For an UL-centric subframe, the control information may include a PDCCH indicating the time-frequency resource assignments for data transmissions from the subordinate entity to the scheduling entity. In addition, other downlink control information may also be included within the control portion.

At block 1806, data information corresponding to the control information is included in the data portion of the first subframe. For example, in a DL-centric subframe, the data information may include data packets transmitted to the subordinate entity on a downlink data channel. In an UL-centric subframe, the data information may include data packets transmitted from the subordinate entity on an uplink data channel.

At block 1808, the scheduling entity generates a second subframe subsequent to the first subframe and includes acknowledgement information corresponding to the data information in the acknowledgement portion of the second subframe. For example, in a DL-centric subframe as shown in FIG. 8, an ACK/NACK message from the subordinate entity that received data in the data portion of the first subframe may be included in the acknowledgement portion of the second subframe to indicate whether the subordinate entity correctly received the downlink data. In an UL-centric subframe as shown in FIG. 12, the acknowledgement information may include an ACK/NACK message to the subordinate entity that transmitted data in the data portion of the first subframe to indicate whether the scheduling entity correctly received the uplink data.

Figure 19:
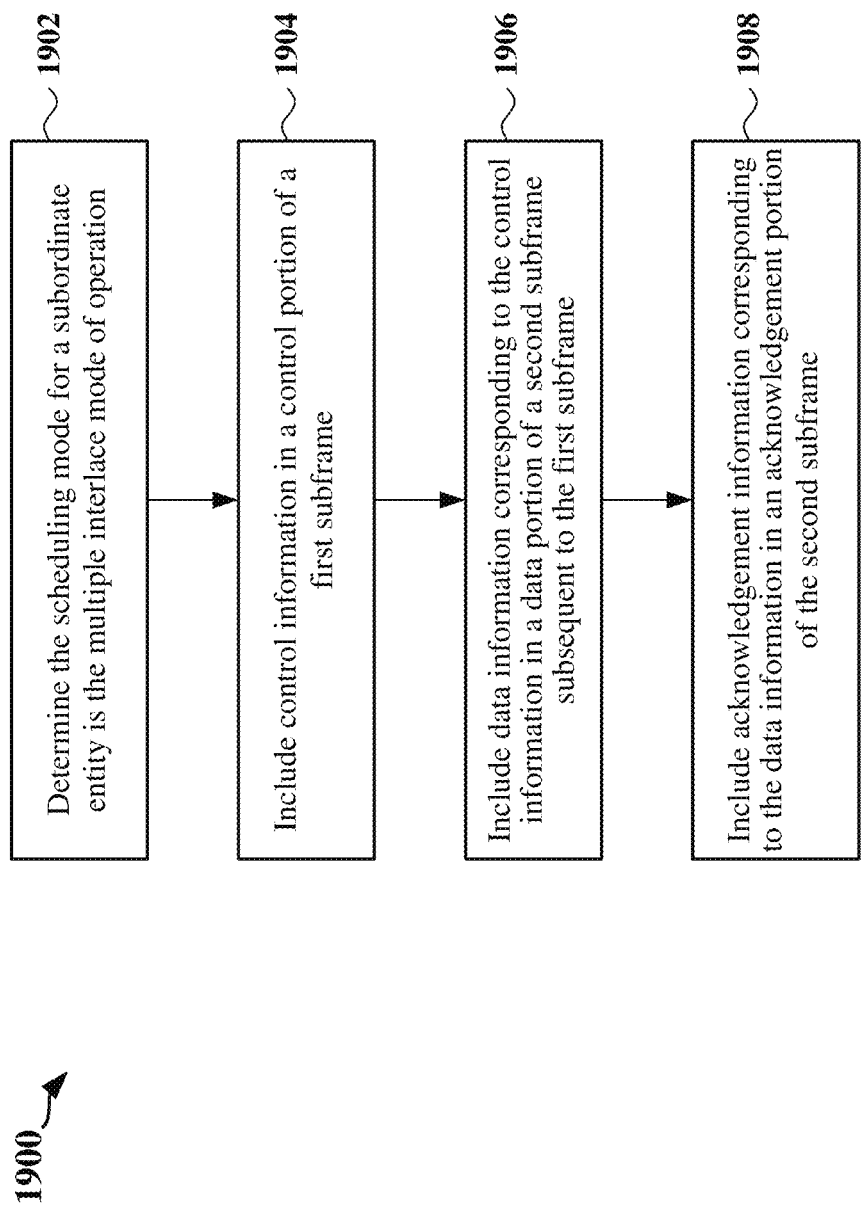
FIG. 19 is a flow chart of a method of wireless communication utilizing a TDD subframe structure in a multiple interlace mode of operation.

FIG. 19 is a flow chart 1900 of a method of wireless communication utilizing a TDD subframe structure in a multiple interlace mode of operation. The method may be performed by a scheduling entity as described above and illustrated in FIGS. 2 and 3, by a processor or processing system, or by any suitable means for carrying out the described functions.

At block 1902, the scheduling entity determines the scheduling mode for a subordinate entity is a multiple interlace mode of operation. In the multiple interlace mode of operation, two or more TDD subframes are utilized to transmit the control, data (or retransmitted data) and acknowledgement information. Although the subframe structure in the multiple interlace mode of operation may be the same as that in the single interlace mode of operation, the subframe structure may not be entirely self-contained.

At block 1904, the scheduling entity generates a first subframe and includes control information in the control portion of the first subframe. For a DL-centric subframe, the control information may include a PDCCH indicating the time-frequency resource assignments for data transmissions from the scheduling entity to the subordinate entity. For an UL-centric subframe, the control information may include a PDCCH indicating the time-frequency resource assignments for data transmissions from the subordinate entity to the scheduling entity. In addition, other downlink control information may also be included within the control portion.

At block 1906, the scheduling entity generates a second subframe subsequent to the first subframe and includes data information corresponding to the control information in the data portion of the second subframe. For example, in a DL-centric subframe as shown in FIGS. 9 and 10, the data information may include data packets transmitted to the subordinate entity on a downlink data channel. In an UL-centric subframe as shown in FIG. 14, the data information may include data packets transmitted from the subordinate entity on an uplink data channel.

At block 1908, acknowledgement information corresponding to the data information is included in the acknowledgement portion of the second subframe. For example, in a DL-centric subframe as shown in FIG. 9, an ACK/NACK message from the subordinate entity that received data in the data portion of the second subframe may be included in the acknowledgement portion of the second subframe to indicate whether the subordinate entity correctly received the downlink data. In an UL-centric subframe as shown in FIG. 14, the acknowledgement information may include an ACK/NACK message to the subordinate entity that transmitted data in the data portion of the first subframe to indicate whether the scheduling entity correctly received the uplink data.

Figure 20:
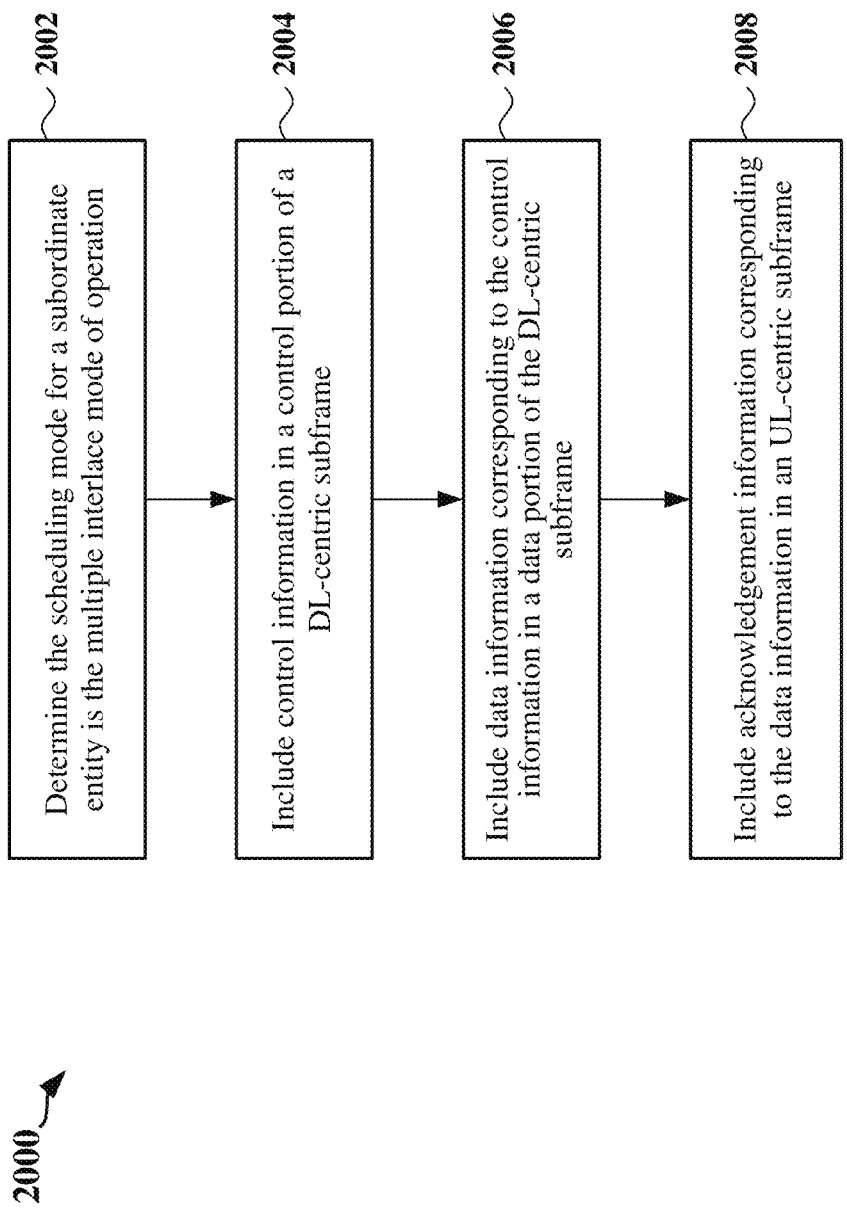
FIG. 20 is a flow chart of a method of wireless communication utilizing a TDD subframe structure in a multiple interlace mode of operation.

FIG. 20 is a flow chart 2000 of a method of wireless communication utilizing a TDD subframe structure in a multiple interlace mode of operation. The method may be performed by a scheduling entity as described above and illustrated in FIGS. 2 and 3, by a processor or processing system, or by any suitable means for carrying out the described functions.

At block 2002, the scheduling entity determines the scheduling mode for a subordinate entity is a multiple interlace mode of operation. In the multiple interlace mode of operation, two or more TDD subframes are utilized to transmit the control, data (or retransmitted data) and acknowledgement information. Although the subframe structure in the multiple interlace mode of operation may be the same as that in the single interlace mode of operation, the subframe structure may not be entirely self-contained.

At block 2004, the scheduling entity generates a DL-centric subframe and includes control information in the control portion of the DL-centric subframe. For example, the control information may include a PDCCH indicating the time-frequency resource assignments for data transmissions from the scheduling entity to the subordinate entity.

At block 2006, data information corresponding to the control information is included in the data portion of the DL-centric subframe. For example, the data information may include data packets transmitted to the subordinate entity on a downlink data channel.

At block 2008, the scheduling entity generates an UL-centric subsequent to the DL-centric subframe and includes acknowledgement information corresponding to the data information in the UL-centric subframe. For example, as shown in FIG. 11, an ACK/NACK message from the subordinate entity that received data in the data portion of the DL-centric subframe may be included in the data portion of the UL-centric subframe to indicate whether the subordinate entity correctly received the downlink data.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication in a wireless communication network for a subordinate entity to communicate with a scheduling entity, the method comprising:
    receiving first control information in a first control portion of a first subframe of a plurality of subframes, wherein the first control information comprises a first downlink assignment for the subordinate entity;
    receiving first data corresponding to the first downlink assignment in a first data portion of a second subframe subsequent to the first subframe; and
    transmitting first acknowledgement information corresponding to the first data in a first acknowledgement portion of the second subframe.

2. The method of claim 1, further comprising:
    receiving second control information scheduling a retransmission of at least part of the first data in a second control portion of a third subframe subsequent to the second subframe.

3. The method of claim 2, wherein the third subframe immediately follows the second subframe, and further comprising:
    receiving the retransmission of the at least part of the first data in a second data portion of the third subframe; and
    transmitting second acknowledgement information corresponding to the retransmission of the at least part of the first data in a second acknowledgement portion of the third subframe.

4. The method of claim 3, wherein the retransmission utilizes a pre-generated waveform.

5. The method of claim 1, further comprising:
    receiving second control information in a second control portion of a third subframe subsequent to the second subframe, wherein the second control information comprises a second downlink assignment for the subordinate entity;

receiving second data corresponding to the second downlink assignment in a second data portion of the third subframe; and transmitting second acknowledgement information corresponding to the second data in a second acknowledgement portion of the third subframe.

6. The method of claim 5, wherein at least one intermediate subframe separates the third subframe in time from the second subframe.

7. The method of claim 1, further comprising:

receiving second control information in a second control portion of a third subframe subsequent to the second subframe, wherein the second control information comprises a second downlink assignment for the subordinate entity;

receiving second data corresponding to the second downlink assignment in a second data portion of the third subframe; and transmitting second acknowledgement information corresponding to the second data in a second acknowledgement portion of a fourth subframe subsequent to the third subframe.

8. The method of claim 7, further comprising:

receiving a retransmission of at least part of the second data in a third data portion of a fifth subframe subsequent to the fourth subframe.

9. The method of claim 1, further comprising:

receiving second control information in a second control portion of a third subframe subsequent to the second subframe, wherein the second control information comprises a second downlink assignment for the subordinate entity;

receiving second data corresponding to the second downlink assignment in a second data portion of a fourth subframe subsequent to the third subframe; and transmitting second acknowledgement information corresponding to the second data in a second acknowledgement portion of the fourth subframe.

10. The method of claim 1, further comprising:

receiving second control information in a second control portion of a third subframe subsequent to the second subframe, wherein the second control information comprises a second downlink assignment for the subordinate entity;

receiving second data corresponding to the second downlink assignment in a second data portion of the third subframe; and transmitting second acknowledgement information corresponding to the second data in an uplink data portion of a fourth subframe subsequent to the third subframe.

11. The method of claim 1, wherein each of the plurality of subframes comprises a plurality of symbols, and wherein the first control portion comprises at least one symbol of the plurality of symbols of the first subframe other than a first symbol of the first subframe.

12. The method of claim 1, wherein the first acknowledgement portion comprises an end of the second subframe.

13. A user equipment in a wireless communication network, comprising:

a memory; and a processor coupled to the memory, wherein the memory and the processor are configured to:

receive first control information in a first control portion of a first subframe of a plurality of subframes, wherein the first control information comprises a first downlink assignment for the user equipment;

receive first data corresponding to the first downlink assignment in a first data portion of a second subframe subsequent to the first subframe; and transmit first acknowledgement information corresponding to the first data in a first acknowledgement portion of the second subframe.

14. The user equipment of claim 13, further comprising:

a transceiver, wherein the memory and the processor are further configured to:

receive second control information scheduling a retransmission of at least part of the first data in a second control portion of a third subframe subsequent to the second subframe.

15. The user equipment of claim 14, wherein the third subframe immediately follows the second subframe, and wherein the memory and the processor are further configured to:

receive the retransmission of the at least part of the first data in a second data portion of the third subframe; and transmit second acknowledgement information corresponding to the retransmission of the at least part of the first data in a second acknowledgement portion of the third subframe.

16. The user equipment of claim 15, wherein the retransmission utilizes a pre-generated waveform.

17. The user equipment of claim 13, wherein the memory and the processor are further configured to:

receive second control information in a second control portion of a third subframe subsequent to the second subframe, wherein the second control information comprises a second downlink assignment for the user equipment;

receive second data corresponding to the second downlink assignment in a second data portion of the third subframe; and transmit second acknowledgement information corresponding to the second data in a second acknowledgement portion of the third subframe.

18. The user equipment of claim 17, wherein at least one intermediate subframe separates the third subframe in time from the second subframe.

19. The user equipment of claim 13, wherein the memory and the processor are further configured to:

receive second control information in a second control portion of a third subframe subsequent to the second subframe, wherein the second control information comprises a second downlink assignment for the user equipment;

receive second data corresponding to the second downlink assignment in a second data portion of the third subframe; and transmit second acknowledgement information corresponding to the second data in a second acknowledgement portion of a fourth subframe subsequent to the third subframe.

20. The user equipment of claim 19, wherein the memory and the processor are further configured to:

receive a retransmission of at least part of the second data in a third data portion of a fifth subframe subsequent to the fourth subframe.

21. The user equipment of claim 13 wherein the memory and the processor are further configured to:

receive second control information in a second control portion of a third subframe subsequent to the second subframe, wherein the second control information comprises a second downlink assignment for the user equipment;

receive second data corresponding to the second downlink assignment in a second data portion of a fourth subframe subsequent to the third subframe; and transmit second acknowledgement information corresponding to the second data in a second acknowledgement portion of the fourth subframe.

22. The user equipment of claim 13, wherein the memory and the processor are further configured to:

receive second control information in a second control portion of a third subframe subsequent to the second subframe, wherein the second control information comprises a second downlink assignment for the user equipment;

receive second data corresponding to the second downlink assignment in a second data portion of the third subframe; and transmit second acknowledgement information corresponding to the second data in an uplink data portion of fourth subframe subsequent to the third subframe.

23. The user equipment of claim 13, wherein each of the plurality of subframes comprises a plurality of symbols, and wherein the first control portion comprises at least one symbol of the plurality of symbols of the first subframe other than a first symbol of the first subframe.

24. The user equipment of claim 13, wherein the first acknowledgement portion comprises an end of the second subframe.

25. An apparatus configured for wireless communication, comprising:

means for receiving first control information in a first control portion of a first subframe of a plurality of subframes, wherein the first control information comprises a first downlink assignment for the apparatus;

means for receiving first data corresponding to the first downlink assignment in a first data portion of a second subframe subsequent to the first subframe; and means for transmitting first acknowledgement information corresponding to the first data in a first acknowledgement portion of the second subframe.

26. The apparatus of claim 25, further comprising:
means for receiving second control information scheduling a retransmission of at least part of the first data in a second control portion of a third subframe subsequent to the second subframe.

27. The apparatus of claim 26, wherein the third subframe immediately follows the second subframe, and further comprising:

means for receiving the retransmission of the at least part of the first data in a second data portion of the third subframe; and means for transmitting second acknowledgement information corresponding to the retransmission of the at least part of the first data in a second acknowledgement portion of the third subframe.

28. The apparatus of claim 27, wherein the retransmission utilizes a pre- generated waveform.

29. The apparatus of claim 25, further comprising:
means for receiving second control information in a second control portion of a third subframe subsequent to the second subframe, wherein the second control information comprises a second downlink assignment for the apparatus;

means for receiving second data corresponding to the second downlink assignment in a second data portion of the third subframe; and means for transmitting second acknowledgement information corresponding to the second data in a second acknowledgement portion of the third subframe.

30. The apparatus of claim 29, wherein at least one intermediate subframe separates the third subframe in time from the second subframe.

31. The apparatus of claim 25, further comprising:
means for receiving second control information in a second control portion of a third subframe subsequent to the second subframe, wherein the second control information comprises a second downlink assignment for the apparatus;

means for receiving second data corresponding to the second downlink assignment in a second data portion of the third subframe; and means for transmitting second acknowledgement information corresponding to the second data in a second acknowledgement portion of a fourth subframe subsequent to the third subframe.

32. The apparatus of claim 31, further comprising:
means for receiving a retransmission of at least part of the second data in a third data. portion of a fifth subframe subsequent to the fourth subframe.

33. The apparatus of claim 25, further comprising:
means for receiving second control information in a second control portion of a third subframe subsequent to the second subframe, wherein the second control information comprises a second downlink assignment for the apparatus;

means for receiving second data corresponding to the second downlink assignment in a second data portion of a fourth subframe subsequent to the third subframe; and means for transmitting second acknowledgement information corresponding to the second data in a second acknowledgement portion of the fourth subframe.

34. The apparatus of claim 25, further comprising:
means for receiving second control information in a second control portion of a third subframe subsequent to the second subframe, wherein the second control information comprises a second downlink assignment for the apparatus;

means for receiving second data corresponding to the second downlink assignment in a second data portion of the third subframe; and means for transmitting second acknowledgement information corresponding to the second data in an uplink data portion of fourth subframe subsequent to the third subframe.

35. The apparatus of claim 25, wherein each of the plurality of subframes comprises a plurality of symbols, and wherein the first control portion comprises at least one symbol of the plurality of symbols of the first subframe other than a first symbol of the first subframe.

36. The apparatus of claim 25, wherein the first acknowledgement portion comprises an end of the second subframe.

37. A method of wireless communication in a wireless communication network for a subordinate entity to communicate with a scheduling entity, the method comprising:

receiving first control information in a first control portion of a first subframe of a plurality of subframes, each of the plurality of subframes comprising a plurality of symbols, each of the plurality of symbols associated with a transmission direction, wherein the first control information comprises a first downlink assignment for the subordinate entity;

receiving first data corresponding to the first downlink assignment in a first data portion of a second subframe subsequent to the first subframe; and transmitting first acknowledgement information corresponding to the first data in a first acknowledgement portion of the second subframe.

38. The method of claim 37, further comprising:

receiving second control information scheduling a retransmission of at least part of the first data in a second control portion of a third subframe subsequent to the second subframe.

39. The method of claim 38, wherein the third subframe immediately follows the second subframe, and further comprising:

receiving the retransmission of the at least part of the first data in a second data portion of the third subframe; and transmitting second acknowledgement information corresponding to the retransmission of the at least part of the first data in a second acknowledgement portion of the third subframe.

40. A user equipment in a wireless communication network, comprising:

a memory; and a processor coupled to the memory, wherein the memory and the processor are configured to:

receive first control information in a first control portion of a first subframe of a plurality of subframes, each of the plurality of subframes comprising a plurality of symbols, each of the plurality of symbols associated with a transmission direction, wherein the first control information comprises a first downlink assignment for the user equipment;

receive first data corresponding to the first downlink assignment in a first data portion of a second subframe subsequent to the first subframe; and transmit first acknowledgement information corresponding to the first data in a first acknowledgement portion of the second subframe.

41. The user equipment of claim 40, wherein the memory and the processor are further configured to:

receive second control information scheduling a retransmission of at least part of the first data in a second control portion of a third subframe subsequent to the second subframe.

42. The user equipment of claim 41, wherein the third subframe immediately follows the second subframe, and wherein the memory and the processor are further configured to:

receive the retransmission of the at least part of the first data in a second data portion of the third subframe; and transmit second acknowledgement information corresponding to the retransmission of the at least part of the first data in a second acknowledgement portion of the third subframe.

43. An apparatus configured for wireless communication, comprising:

means for receiving first control information in a first control portion of a first subframe of a plurality of subframes, each of the plurality of subframes comprising a plurality of symbols, each of the plurality of symbols associated with a transmission direction, wherein the first control information comprises a first downlink assignment for the apparatus;

means for receiving first data corresponding to the first downlink assignment in a first data portion of a second subframe subsequent to the first subframe; and means for transmitting first acknowledgement information corresponding to the first data in a first acknowledgement portion of the second subframe.

44. The apparatus of claim 43, further comprising:

means for receiving second control information scheduling a retransmission of at least part of the first data in a second control portion of a third subframe subsequent to the second subframe.

45. The apparatus of claim 44, herein the third subframe immediately follows the second subframe, and further comprising:

means for receiving the retransmission of the at least part of the first data in a second data portion of the third subframe; and means for transmitting second acknowledgement information corresponding to the retransmission of the at least part of the first data in a second acknowledgement portion of the third subframe.

46. A non-transitory computer-readable medium storing computer executable code, comprising code for causing a user equipment in a wireless communication network to:

receive first control information in a first control portion of a first subframe of a plurality of subframes, wherein the first control information comprises a first downlink assignment for the user equipment;

receive first data corresponding to the first downlink assignment in a first data. portion of a second subframe subsequent to the first subframe; and transmit first acknowledgement information corresponding to the first data in a first acknowledgement portion of the second subframe.

47. The non-transitory computer-readable medium of claim 46, further comprising code for causing the user equipment to:

receive second control information scheduling a retransmission of at least part of the first data in a second control portion of a third subframe subsequent to the second subframe.

48. The non-transitory computer-readable medium of claim 47, wherein the third subframe immediately follows the second subframe, and further comprising code for causing the user equipment to:

receive the retransmission of the at least part of the first data in a second data portion of the third subframe; and transmit second acknowledgement information corresponding to the retransmission of the at least part of the first data in a second acknowledgement portion of the third subframe.

49. The non-transitory computer-readable medium of claim 46, wherein the plurality of subframes comprises uplink-centric subframes.

50. The method of claim 1, wherein the plurality of subframes comprises uplink-centric subframes.

51. The user equipment of claim 13, wherein the plurality of subframes comprises uplink-centric subframes.

52. The apparatus of claim 25, wherein the plurality of subframes comprises uplink-centric subframes.

53. A method of wireless communication in a wireless communication network for a subordinate entity to communicate with a scheduling entity, the method comprising:

receiving first control information in a first control portion located in a first subframe position, wherein the first control information comprises a first downlink assignment for the subordinate entity;

receiving first data corresponding to the first downlink assignment in a first data portion located in a second subframe position which is based on a data delay relative to the first subframe position; and transmitting first acknowledgement information corresponding to the first data in a first acknowledgement portion located in a third subframe position which is based on an acknowledgement delay relative to the second subframe position.

54. The method of claim 53, wherein the second subframe position is the same as the first subframe position when the data delay has a zero value.

55. The method of claim 53, wherein the second subframe position is subsequent to the first subframe position when the data delay has a non-zero value.

56. The method of claim 53, wherein the third subframe position is the same as the second subframe position when the acknowledgement delay has a zero value.

57. The method of claim 53, wherein the third subframe position is subsequent to the second subframe position when the acknowledgement delay has a non-zero value.

58. The method of claim 53, wherein the second subframe position and the third subframe position are the same as the first subframe position when the data delay has a zero value and the acknowledgement delay has a zero value.

* * * * *